United States Patent [19]
Bilström et al.

[11] Patent Number: 5,910,949
[45] Date of Patent: *Jun. 8, 1999

[54] PACKET CHANNEL FEEDBACK

[75] Inventors: Lars Bilström, Solna, Sweden; John Diachina, Garner, N.C.

[73] Assignee: Telefonaktiebolaget LM Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/544,836

[22] Filed: Oct. 18, 1995

[51] Int. Cl.$^6$ ........................................ H04J 3/17
[52] U.S. Cl. ................. 370/337; 370/349; 370/468; 370/522
[58] Field of Search .................. 370/95.1, 95.3, 370/68, 94.1, 110.1, 110.4, 79, 349, 347, 400, 329, 337, 338, 465, 468, 437, 348, 522, 524; 379/59, 60; 455/33.1, 34.1, 34.2, 70, 58.2

[56] References Cited

U.S. PATENT DOCUMENTS

| | | | |
|---|---|---|---|
| 4,887,265 | 12/1989 | Felix | 370/94.1 |
| 4,916,691 | 4/1990 | Goodman | 370/60 |
| 5,175,867 | 12/1992 | Wejke et al. | 455/33.1 |
| 5,353,332 | 10/1994 | Raith et al. | 379/59 |
| 5,404,355 | 4/1995 | Raith | 370/95.1 |

FOREIGN PATENT DOCUMENTS

| | | |
|---|---|---|
| 0652680 A2 | 5/1995 | European Pat. Off. . |
| 0787569 | 3/1995 | Japan . |
| 94/10767 | 5/1994 | WIPO . |

OTHER PUBLICATIONS

"Idle–Signal Casting Multiple Access with Partial Echo (ICMA–PE) For Mobile Packet Communications", N. Umeda et al., Electronics & Communications in Japan, Part I—Communications, vol. 77, No. 4, Apr. 1, 1994, New York, pp. 92–102.

"Aggressive Packet Reservation Multiple Access Using Signatures", Q. Guo et al., International Symposium on Personal, Indoor and Mobile Radio Communications (PIMRC' 94, vol. 4, Sep. 18, 1994, Amsterdam (NL), pp. 1247–1253.

"Cellular System Dual–Mode Mobile Station—Base Station Compatibility Standard", *EIA/TIA Interim Standard, IS–54–B*, pertinent pages only, Apr. 1992.

K. Felix, "Packet Switching in Digital Cellular Systems", *Proc. 38th IEEE Vehicular Technology Conf*, pp. 414–418, Jun. 1988.

P. Decker et al., "A General Packet Radio Proposed for GSM", *GSM in a Future Competitive Environment*, Helsinki, Finland, pp. 1–20, Oct. 13, 1993.

P. Decker, "Packet Radio in GSM", *European Telecommunications Standards Institute (ETSI)*, T Doc SMG 4 58/93, pp. 1–13 (odd pages only), Feb. 12, 1993.

J. Hämäläinen et al., "Packet Data Over GSM Network", T Doc SMG 1 238/93, *ETSI*, pp. 1–8, Sep. 28, 1993.

*Primary Examiner*—Chau Nguyen
*Attorney, Agent, or Firm*—Burns, Doane, Swecker & Mathis, L.L.P.

[57] ABSTRACT

A method is disclosed for improving the efficiency of the packet data channel by providing means for interrupting tranmsissions so as to allow a communication system to send a short message to a different mobile station. The packet channel feedback information includes several flags: Busy-Reserved/Idle (BRI); Received/Not Received (R/N); Partial Echo (PE); and Partial Echo Qualifier (PEQ). The PEQ allows the communication system to interrupt the transmission to one mobile station to send a short message to another mobile station. By setting the PEQ to various values, a mobile station can determine whether subchannel ownership has been temporarily interrupted and reassigned to another station.

12 Claims, 14 Drawing Sheets

PACKET CHANNEL FEEDBACK

BACKGROUND

Applicants' invention relates to electrical telecommunication, and more particularly to wireless communication systems, such as cellular and satellite radio systems, for various modes of operation (analog, digital, dual mode, etc.), and access techniques such as frequency division multiple access (FDMA), time division multiple access (TDMA), code division multiple access (CDMA), and hybrid FDMA/TDMA/CDMA. More specifically, this invention relates to slot formats for transmissions between a communication system and a mobile station on a packet data channel.

In North America, digital communication and multiple access techniques such as TDMA are currently provided by a digital cellular radiotelephone system called the digital advanced mobile phone service (D-AMPS), some of the characteristics of which are specified in the interim standard TIA/EIA/IS-54-B, "Dual-Mode Mobile Station-Base Station Compatibility Standard", published by the Telecommunications Industry Association and Electronic Industries Association (TIA/EIA), which is expressly incorporated herein by reference. Because of a large existing consumer base of equipment operating only in the analog domain with frequency-division multiple access (FDMA), TIA/EIA/IS-54-B is a dual-mode (analog and digital) standard, providing for analog compatibility together with digital communication capability. For example, the TIA/EIA/IS-54-B standard provides for both FDMA analog voice channels (AVC) and TDMA digital traffic channels (DTC). The AVCs and DTCs are implemented by frequency modulating radio carrier signals, which have frequencies near 800 megahertz (MHz) such that each radio channel has a spectral width of 30 kilohertz (KHz).

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

The successive time slots assigned to the same user, which are usually not consecutive time slots on the radio carrier, constitute the user's digital traffic channel, which may be considered a logical channel assigned to the user. As described in more detail below, digital control channels (DCCs) can also be provided for communicating control signals, and such a DCC is a logical channel formed by a succession of usually non-consecutive time slots on the radio carrier.

In only one of many possible embodiments of a TDMA system as described above, the TIA/EIA/IS-54-B standard provided that each TDMA frame consists of six consecutive time slots and has a duration of 40 milliseconds (msec). Thus, each radio channel can carry from three to six DTCs (e.g., three to six telephone conversations), depending on the source rates of the speech coder/decoders (codecs) used to digitally encode the conversations. Such speech codecs can operate at either full-rate or half-rate. A full-rate DTC requires twice as many time slots in a given time period as a half-rate DTC, and in TIA/EIA/IS-54-B, each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, 324 bits are transmitted, of which the major portion, 260 bits, is due to the speech output of the codec, including bits due to error correction coding of the speech output, and the remaining bits are used for guard times and overhead signalling for purposes such as synchronization.

It can be seen that the TDMA cellular system operates in a buffer-and-burst, or discontinuous-transmission, mode: each mobile station transmits (and receives) only during its assigned time slots. At full rate, for example, a mobile station might transmit during slot 1, receive during slot 2, idle during slot 3, transmit during slot 4, receive during slot 5, and idle during slot 6, and then repeat the cycle during succeeding TDMA frames. Therefore, the mobile station, which may be battery-powered, can be switched off, or sleep, to save power during the time slots when it is neither transmitting nor receiving.

In addition to voice or traffic channels, cellular radio communication systems also provide paging/access, or control, channels for carrying call-setup messages between base stations and mobile stations. According to TIA/EIA/IS-54-B, for example, there are twenty-one dedicated analog control channels (ACCs), which have predetermined fixed frequencies for transmission and reception located near 800 MHz. Since these ACCs are always found at the same frequencies, they can be readily located and monitored by the mobile stations.

For example, when in an idle state (i.e., switched on but not making or receiving a call), a mobile station in a TIA/EIA/IS-54-B system tunes to and then regularly monitors the strongest control channel (generally, the control channel of the cell in which the mobile station is located at that moment) and may receive or initiate a call through the corresponding base station. When moving between cells while in the idle state, the mobile station will eventually "lose" radio connection on the control channel of the "old" cell and tune to the control channel of the "new" cell. The initial tuning and subsequent re-tuning to control channels are both accomplished automatically by scanning all the available control channels at their known frequencies to find the "best" control channel. When a control channel with good reception quality is found, the mobile station remains tuned to this channel until the quality deteriorates again. In this way, mobile stations stay "in touch" with the system.

While in the idle state, a mobile station must monitor the control channel for paging messages addressed to it. For example, when an ordinary telephone (land-line) subscriber calls a mobile subscriber, the call is directed from the public switched telephone network (PSTN) to a mobile switching center (MSC) that analyzes the dialed number. If the dialed number is validated, the MSC requests some or all of a number of radio base stations to page the called mobile station by transmitting over their respective control channels paging messages that contain the mobile identification number (MIN) of the called mobile station. Each idle mobile station receiving a paging message compares the received MIN with its own stored MIN. The mobile station with the matching stored MIN transmits a page response over the particular control channel to the base station, which forwards the page response to the MSC.

Upon receiving the page response, the MSC selects an AVC or a DTC available to the base station that received the page response, switches on a corresponding radio transceiver in that base station, and causes that base station to send a message via the control channel to the called mobile station that instructs the called mobile station to tune to the selected voice or traffic channel. A through-connection for the call is established once the mobile station has tuned to the selected AVC or DTC.

The performance of the system having ACCs that is specified by TIA/EIA/IS-54-B has been improved in a system having digital control channels (DCCs) that is specified in TIA/EIA/IS-136, which is expressly incorporated herein by reference. One example of such a system having DCCs with new formats and processes is described in U.S. patent application Ser. No. 07/956,640, Pat. No. 5,407,355 entitled "Digital Control Channel", which was filed on Oct. 5, 1992, and which is incorporated in this application by reference. Using such DCCs, each TIA/EIA/IS-54-B radio channel can carry DTCs only, DCCs only, or a mixture of both DTCs and DCCs. Within the TIA/EIA/IS-136-B framework, each radio carrier frequency can have up to three full-rate DTCs/DCCs, or six half-rate DTCs/DCCs, or any combination in between, for example, one full-rate and four half-rate DTCs/DCCs.

In general, however, the transmission rate of the DCC need not coincide with the half-rate and full-rate specified in TIA/EIA/IS-54-B, and the length of the DCC slots may not be uniform and may not coincide with the length of the DTC slots. The DCC may be defined on an TIA/EIA/IS-54-B radio channel and may consist, for example, of every n-th slot in the stream of consecutive TDMA slots. In this case, the length of each DCC slot may or may not be equal to 6.67 msec, which is the length of a DTC slot according to TIA/EIA/IS-54-B. Alternatively (and without limitation on other possible alternatives), these DCC slots may be defined in other ways known to one skilled in the art.

In cellular telephone systems, an air link protocol is required in order to allow a mobile station to communicate with the base stations and MSC. The communications link protocol is used to initiate and to receive cellular telephone calls. As described in U.S. patent application Ser. No. 08/477,574, now U.S. Pat. No. 5,610,917, entitled "Layer 2 Protocol for the Random Access Channel and the Access Response Channel," which was filed on Jun. 7, 1995, and which is incorporated in this application by reference, the communications link protocol is commonly referred to within the communications industry as a Layer 2 protocol, and its functionality includes the delimiting, or framing, of Layer 3 messages. These Layer 3 messages may be sent between communicating Layer 3 peer entities residing within mobile stations and cellular switching systems. The physical layer (Layer 1) defines the parameters of the physical communications channel, e.g., radio frequency spacing, modulation characteristics, etc. Layer 2 defines the techniques necessary for the accurate transmission of information within the constraints of the physical channel, e.g., error correction and detection, etc. Layer 3 defines the procedures for reception and processing of information transmitted over the physical channel.

Communications between mobile stations and the cellular switching system (the base stations and the MSC) can be described in general with reference to FIGS. 1 and 2. FIG. 1 schematically illustrates pluralities of Layer 3 messages 11, Layer 2 frames 13, and Layer 1 channel bursts, or time slots, 15. In FIG. 1, each group of channel bursts corresponding to each Layer 3 message may constitute a logical channel, and as described above, the channel bursts for a given Layer 3 message would usually not be consecutive slots on an TIA/EIA/136 carrier. On the other hand, the channel bursts could be consecutive; as soon as one time slot ends, the next time slot could begin.

Each Layer 1 channel burst 15 contains a complete Layer 2 frame as well as other information such as, for example, error correction information and other overhead information used for Layer 1 operation. Each Layer 2 frame contains at least a portion of a Layer 3 message as well as overhead information used for Layer 2 operation. Although not indicated in FIG. 1, each Layer 3 message would include various information elements that can be considered the payload of the message, a header portion for identifying the respective message's type, and possibly padding.

Each Layer 1 burst and each Layer 2 frame is divided into a plurality of different fields. In particular, a limited-length DATA field in each Layer 2 frame contains the Layer 3 message 11. Since Layer 3 messages have variable lengths depending upon the amount of information contained in the Layer 3 message, a plurality of Layer 2 frames may be needed for transmission of a single Layer 3 message. As a result, a plurality of Layer 1 channel bursts may also be needed to transmit the entire Layer 3 message as there is a one-to-one correspondence between channel bursts and Layer 2 frames.

As noted above, when more than one channel burst is required to send a Layer 3 message, the several bursts are not usually consecutive bursts on the radio channel. Moreover, the several bursts are not even usually successive bursts devoted to the particular logical channel used for carrying the Layer 3 message. Since time is required to receive, process, and react to each received burst, the bursts required for transmission of a Layer 3 message are usually sent in a staggered format, as schematically illustrated in FIG. 2(a) and as described above in connection with the TIA/EIA/IS-136 standard.

FIG. 2(a) shows a general example of a forward (or downlink) DCC configured as a succession of time slots 1, 2, ..., N, ... included in the consecutive time slots 1, 2, ... sent on a carrier frequency. These DCC slots may be defined on a radio channel such as that specified by TIA/EIA/IS-136, and may consist, as seen in FIG. 2(a) for example, of every n-th slot in a series of consecutive slots. Each DCC slot has a duration that may or may not be 6.67 msec, which is the length of a DTC slot according to the TIA/EIA/IS-136 standard.

As shown in FIG. 2(a), the DCC slots may be organized into superframes (SF), and each superframe includes a number of logical channels that carry different kinds of information. One or more DCC slots may be allocated to each logical channel in the superframe. The exemplary downlink superframe in FIG. 2(a) includes three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 2 may be dedicated to other logical channels, such as additional paging channels PCH or other channels. Since the number of mobile stations is usually much greater than the number of slots in the superframe, each paging slot is used for paging several mobile stations that share some unique characteristic, e.g., the last digit of the MIN.

FIG. 2(b) illustrates a preferred information format for the slots of a forward DCC. FIG. 2(b) indicates the number of bits in each field above that field. The bits sent in the SYNC information are used in a conventional way to help ensure accurate reception of the CSFP and DATA fields. The SYNC information carries a predetermined bit pattern used by the base stations to find the start of the slot. The SCF information is used to control a random access channel (RACH), which is used by the mobile to request access to the system. The CSFP information conveys a coded superframe phase value that enables the mobile stations to find the start of each superframe. This is just one example for the information format in the slots of the forward DCC.

For purposes of efficient sleep mode operation and fast cell selection, the BCCH may be divided into a number of sub-channels. U.S. patent application Ser. No. 07/956,640 disclose a BCCH structure that allows the mobile station to read a minimum amount of information when it is switched on (when it locks onto a DCC) before being able to access the system (place or receive a call). After being switched on, an idle mobile station needs to regularly monitor only its assigned PCH slots (usually one in each superframe); the mobile can sleep during other slots. The ratio of the mobile's time spent reading paging messages and its time spent asleep is controllable and represents a tradeoff between call-set-up delay and power consumption.

Since each TDMA time slot has a certain fixed information carrying capacity, each burst typically carries only a portion of a Layer 3 message as noted above. In the uplink direction, multiple mobile stations attempt to communicate with the system on a contention basis, while multiple mobile stations listen for Layer 3 messages sent from the system in the downlink direction. In known systems, any given Layer 3 message must be carried using as many TDMA channel bursts as required to send the entire Layer 3 message.

Digital control and traffic channels are desirable for these and other reasons described in U.S. patent application Ser. No. 08/147,254, U.S. Pat. No. 5,603,081, entitled "A Method for Communicating in a Wireless Communication System", which was filed on Nov. 1, 1993, and which is incorporated in this application by reference. For example, they support longer sleep periods for the mobile units, which results in longer battery life.

Digital traffic channels and digital control channels have expanded functionality for optimizing system capacity and supporting hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

FIG. 3 is an exemplary hierarchical, or multi-layered, cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

FIG. 4 represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by the above-cited U.S. patent applications and by U.S. Pat. No. 5,175,867 to Wejke et al., entitled "Neighbor-Assisted Handoff in a Cellular Communication System," and U.S. patent application Ser. No. 07/967,027, U.S. Pat. No. 5,745,523, entitled "Multi-mode Signal Processing," which was filed on Oct. 27, 1992, both of which are incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with DCCs and DTCs that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

To increase the user's "talk time", i.e., the battery life of the mobile station, U.S. patent application Ser. No. 07/956, 640, U.S. Pat. No. 5,404,355 discloses a digital forward control channel (base station to mobile station) that can carry the types of messages specified for current analog forward control channels (FOCCs), but in a format which allows an idle mobile station to read overhead messages when locking onto the FOCC and thereafter only when the information has changed; the mobile sleeps at all other times. In such a system, some types of messages are broadcast by the base stations more frequently than other types, and mobile stations need not read every message broadcast.

The systems specified by the TIA/EIA/IS-54-B and TIA/EIA/IS-136 standards are circuit-switched technology, which is a type of "connection-oriented" communication that establishes a physical call connection and maintains that connection for as long as the communicating end-systems have data to exchange. The direct connection of a circuit switch serves as an open pipeline, permitting the end-systems to use the circuit for whatever they deem appropriate. While circuit-switched data communication may be well suited to constant-bandwidth applications, it is relatively inefficient for low-bandwidth and "bursty" applications.

Packet-switched technology, which may be connection-oriented (e.g., X.25) or "connectionless" (e.g., the Internet Protocol, "IP"), does not require the set-up and tear-down of a physical connection, which is in marked contrast to circuit-switched technology. This reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers", stationed between the communicating end-systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

Packet transmission along a route that takes into consideration path metrics, as opposed to a single circuit set up, offers application and communications flexibility. It is also how most standard local area networks (LANs) and wide area networks (WANs) have evolved in the corporate environment. Packet switching is appropriate for data communications because many of the applications and devices used, such as keyboard terminals, are interactive and transmit data in bursts. Instead of a channel being idle while a user inputs more data into the terminal or pauses to think about a problem, packet switching interleaves multiple transmissions from several terminals onto the channel.

Packet data provides more network robustness due to path independence and the routers' ability to select alternative paths in the event of network node failure. Packet switching, therefore, allows for more efficient use of the network lines. Packet technology offers the option of billing the end user based on amount of data transmitted instead of connection time. If the end user's application has been designed to make efficient use of the air link, then the number of packets transmitted will be minimal. If each individual user's traffic is held to a minimum, then the service provider has effectively increased network capacity.

Packet networks are usually designed and based on industry-wide data standards such as the open system interface (OSI) model or the TCP/IP protocol stack. These standards have been developed, whether formally or de facto, for many years, and the applications that use these protocols are readily available. The main objective of standards-based networks is to achieve interconnectivity with other networks. The Internet is today's most obvious example of such a standards-based network pursuit of this goal.

Packet networks, like the Internet or a corporate LAN, are integral parts of today's business and communications environments. As mobile computing becomes pervasive in these environments, wireless service providers such as those using TIA/EIA/IS-136 are best positioned to provide access to these networks. Nevertheless, the data services provided by or proposed for cellular systems are generally based on the circuit-switched mode of operation, using a dedicated radio channel for each active mobile user.

FIG. 5 shows representative architecture used for communicating across an air link that comprises the protocols which provide connectivity between a mobile end system (M-ES), a mobile data base station (MDBS), and a mobile data intermediate system (MD-IS). An exemplary description of the elements in FIG. 5 and a recommended approach for each element when considering alternative RF technologies follows.

The Internet Protocol/Connectionless Network Protocol (IP/CLNP) are network protocols that are connectionless and widely supported throughout the traditional data network community. These protocols are independent of the physical layer and preferably are not modified as the RF technologies change.

The Security Management Protocol (SMP) provides security services across the air link interface. The services furnished include data link confidentiality. M-ES authentication, key management, access control, and algorithm upgradability/replacement. The SMP should remain unchanged when implementing alternative RF technologies.

The Radio Resource Management Protocol (RRMP) provides management and control over the mobile unit's use of the RF resources. The RRMP and its associated procedures are specific to the AMPS RF infrastructure and require change based on the RF technology implemented.

The Mobile Network Registration Protocol (MNRP) is used in tandem with a Mobile Network Location Protocol (MNLP) to allow proper registration and authentication of the mobile end system. The MNRP should be unchanged when using alternative RF technologies.

The Mobile Data Link Protocol (MDLP) provides efficient data transfer between the MD-IS and the M-ES. The MDLP supports efficient mobile system movement, mobile system power conservation, RF channel resources sharing, and efficient error recovery. The MDLP should be unchanged when using alternative RF technologies.

The Medium Access Control (MAC) protocol and associated procedures control the methodology M-ESs use to manage shared access to the RF channel. This protocol and its functionality must be supplied by alternative RF technologies.

Modulation and encoding schemes are used at the physical layer. These schemes are specific to the RF technology employed, and therefore should be replaced with schemes appropriate for the alternative RF technology. The adoption of alternative RF technologies can be implemented with a minimum amount of change to the CDPD system architecture. The required changes are limited to the radio resource management protocol, the MAC, and physical layers; all other network services and support services remain unchanged.

A few exceptions to data services for cellular systems based on the circuitswitched switch mode of operation are described in the following documents, which include the packet data concepts.

U.S. Pat. No. 4,887,265 and "Packet Switching in Digital Cellular Systems", *Proc. 38th IEEE Vehicular Technology Conf.*, pp. 414–418 (June 1988) describe a cellular system providing shared packet data radio channels, each one capable of accommodating multiple data calls. A mobile station requesting packet data service is assigned to a particular packet data channel using essentially regular cellular signalling. The system may include packet access points (PAPS) for interfacing with packet data networks. Each packet data radio channel is connected to one particular PAP and is thus capable of multiplexing data calls associated with that PAP. Handovers are initiated by the system in a manner that is largely similar to the handover used in the same system for voice calls. A new type of handover is added for those situations when the capacity of a packet channel is insufficient.

These documents are data-call oriented and based on using system-initiated handover in a similar way as for regular voice calls. Applying these principles for providing general purpose packet data services in a TDMA cellular system would result in spectrum-efficiency and performance disadvantages.

U.S. Pat. No. 4,916,691 describes a new packet mode cellular radio system architecture and a new procedure for routing (voice and/or data) packets to a mobile station. Base stations, public switches via trunk interface units, and a cellular control unit are linked together via a WAN. The routing procedure is based on mobile-station-initiated handovers and on adding to the header of any packet transmitted from a mobile station (during a call) an identifier of the base station through which the packet passes. In case of an extended period of time between subsequent user information packets from a mobile station, the mobile station may transmit extra control packets for the purpose of conveying cell location information.

The cellular control unit is primarily involved at call establishment, when it assigns to the call a call control number. It then notifies the mobile station of the call control number and the trunk interface unit of the call control number and the identifier of the initial base station. During a call, packets are then routed directly between the trunk interface unit and the currently serving base station.

The system described in U.S. Pat. No. 4,916,691 is not directly related to the specific problems of providing packet data services in TDMA cellular systems.

"Packet Radio in GSM", European Telecommunications Standards Institute (ETSI) T Doc SMG 4 58/93 (Feb. 12, 1993) and "A General Packet Radio Service Proposed for GSM" presented during a seminar entitled "GSM in a Future Competitive Environment", Helsinki, Finland (Oct. 13, 1993) outline a possible packet access protocol for voice and data in GSM. These documents directly relate to TDMA cellular systems, i.e., GSM, and although they outline a possible organization of an optimized shared packet data channel, they do not deal with the aspects of integrating packet data channels in a total system solution.

"Packet Data over GSM Network", T Doc SMG 1 238/93, ETSI (Sep. 28, 1993) describes a concept of providing packet data services in GSM based on first using regular GSM signalling and authentication to establish a virtual channel between a packet mobile station and an "agent" handling access to packet data services. With regular signalling modified for fast channel setup and release, regular traffic channels are then used for packet transfer. This document directly relates to TDMA cellular systems, but since the concept is based on using a "fast switching" version of existing GSM traffic channels, it has disadvantages in terms of spectrum efficiency and packet transfer delays (especially for short messages) compared to a concept based on optimized shared packet data channels.

Cellular Digital Packet Data (CDPD) System Specification, Release 1.0 (July 1993), which is expressly incorporated herein by reference, describes a concept for providing packet data services that utilizes available radio channels on current Advanced Mobile Phone Service (AMPS) systems, i.e., the North American analog cellular system. CDPD is a comprehensive, open specification endorsed by a group of U.S. cellular operators. Items covered include external interfaces, air link interfaces, services, network architecture, network management, and administration.

The specified CDPD system is to a large extent based on an infrastructure that is independent of the existing AMPS infrastructure. Commonalities with AMPS systems are limited to utilization of the same type of radio frequency channels and the same base station sites (the base station used by CDPD may be new and CDPD specific) and employment of a signalling interface for coordinating channel assignments between the two systems.

Routing a packet to a mobile station is based on, first, routing the packet to a home network node (home Mobile Data Intermediate System, MD-IS) equipped with a home location register (HLR) based on the mobile station address; then, when necessary, routing the packet to a visited, serving MD-IS based on HLR information; and finally transferring the packet from the serving MD-IS via the current base station, based on the mobile station reporting its cell location to its serving MD-IS.

Although the CDPD System Specification is not directly related to the specific problems of providing packet data services in TDMA cellular systems that are addresssed by this application, the network aspects and concepts described in the CDPD System Specification can be used as a basis for the network aspects needed for an air link protocol in accordance with this invention.

The CDPD network is designed to be an extension of existing data communications networks and the AMPS cellular network. Existing connectionless network protocols may be used to access the CDPD network. Since the network is always considered to be evolving, it uses an open network design that allows the addition of new network layer protocols when appropriate. The CDPD network services and protocols are limited to the Network Layer of the OSI model and below. Doing so allows upper-layer protocols and applications development without changing the underlying CDPD network.

From the mobile subscriber's perspective, the CDPD network is a wireless mobile extension of traditional networks, both data and voice. By using a CDPD service provider network's service, the subscriber is able seamlessly to access data applications, many of which may reside on traditional data networks. The CDPD system may be viewed as two interrelated service sets: CDPD network support services and CDPD network services.

CDPD network support services perform duties necessary to maintain and administer the CDPD network. These services are: accounting server; network management system; message transfer server; and authentication server. These services are defined to permit interoperability among service providers. As the CDPD network evolves technically beyond its original AMPS infrastructure, it is anticipated that the support services shall remain unchanged. The functions of network support services are necessary for any mobile network and are independent of radio frequency (RF) technology.

CDPD network services are data transfer services that allow subscribers to communicate with data applications. Additionally, one or both ends of the data communications may be mobile.

To summarize, there is a need for a system providing general purpose packet data services in D-AMPS cellular systems, based on providing shared packet-data channels optimized for packet data. This application is directed to systems and methods that provide the combined advantages of a connection-oriented network like that specified by the TIA/EIA/IS-136 standard and a connectionless, packet data network. Furthermore, the present invention is directed to accessing the CDPD network, for example, by existing connectionless network protocols with low complexity and high throughput.

SUMMARY

According to one embodiment of this invention, a communication system supplies packet channel feedback information to mobile stations communicating with the system.

It is an object of one embodiment of this invention to provide maximum efficiency of the packet data channel by providing means for interrupting tranmsissions so as to allow a communication system to send a short message to a different mobile station. According to the present invention, the packet channel feedback information includes several flags: Busy-Reserved/Idle (BRI); Received/Not Received (R/N); Partial Echo (PE); and Partial Echo Qualifier (PEQ). The PEQ allows the communication system to interrupt the transmission to one mobile station to send a short message to another mobile station. By setting the PEQ to various values, a mobile station can determine whether subchannel ownership has been temporarily interrupted and reassigned to another station.

According to another aspect of the invention, the packet data channel consists of three subchannels on packet digital control channels so as to provide sufficient processing time at both a mobile station and a base station in conjunction with a random access event.

BRIEF DESCRIPTION OF THE DRAWINGS

The features and advantages of Applicants' invention will be understood by reading this description in conjunction with the drawings in which:

FIG. 8 illustrates an example of a slot format for BMI→MS on PDCH;

DETAILED DESCRIPTION

Figure 1:
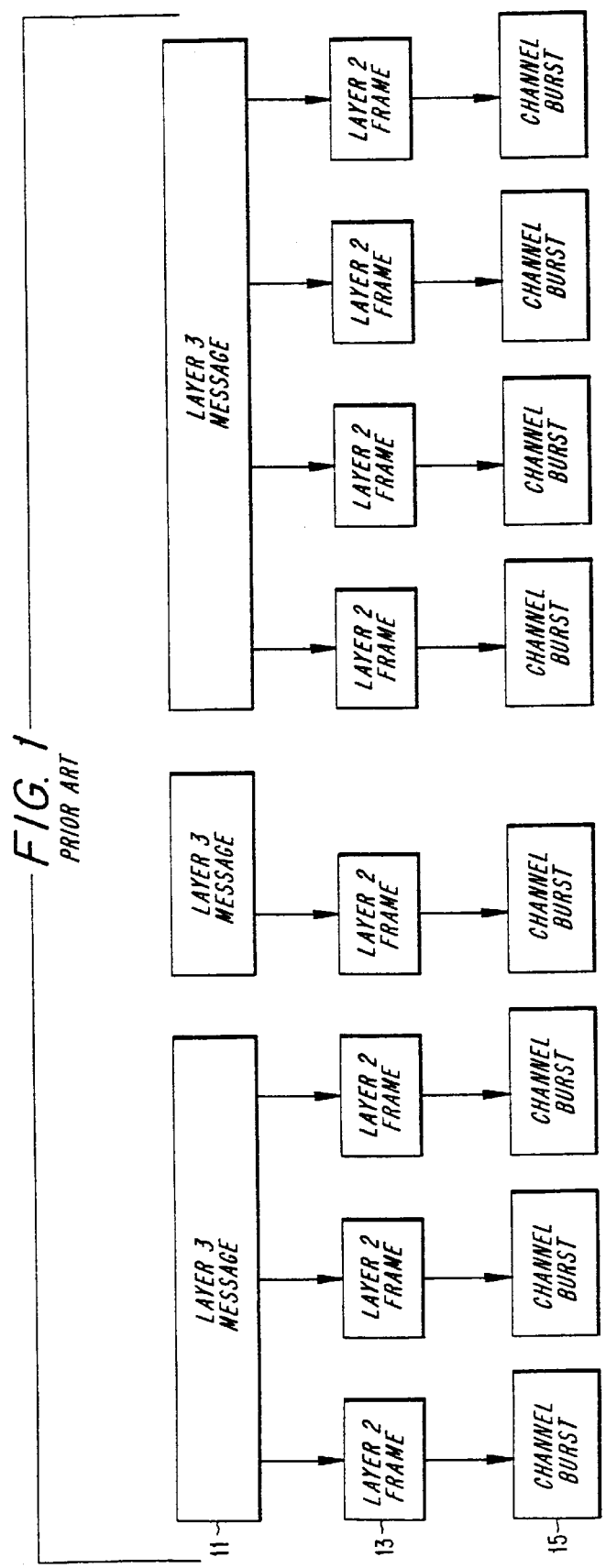
FIG. 1 schematically illustrates pluralities of Layer 3 messages, Layer 2 frames, and Layer 1 channel bursts, or time slots.
Figure 2:
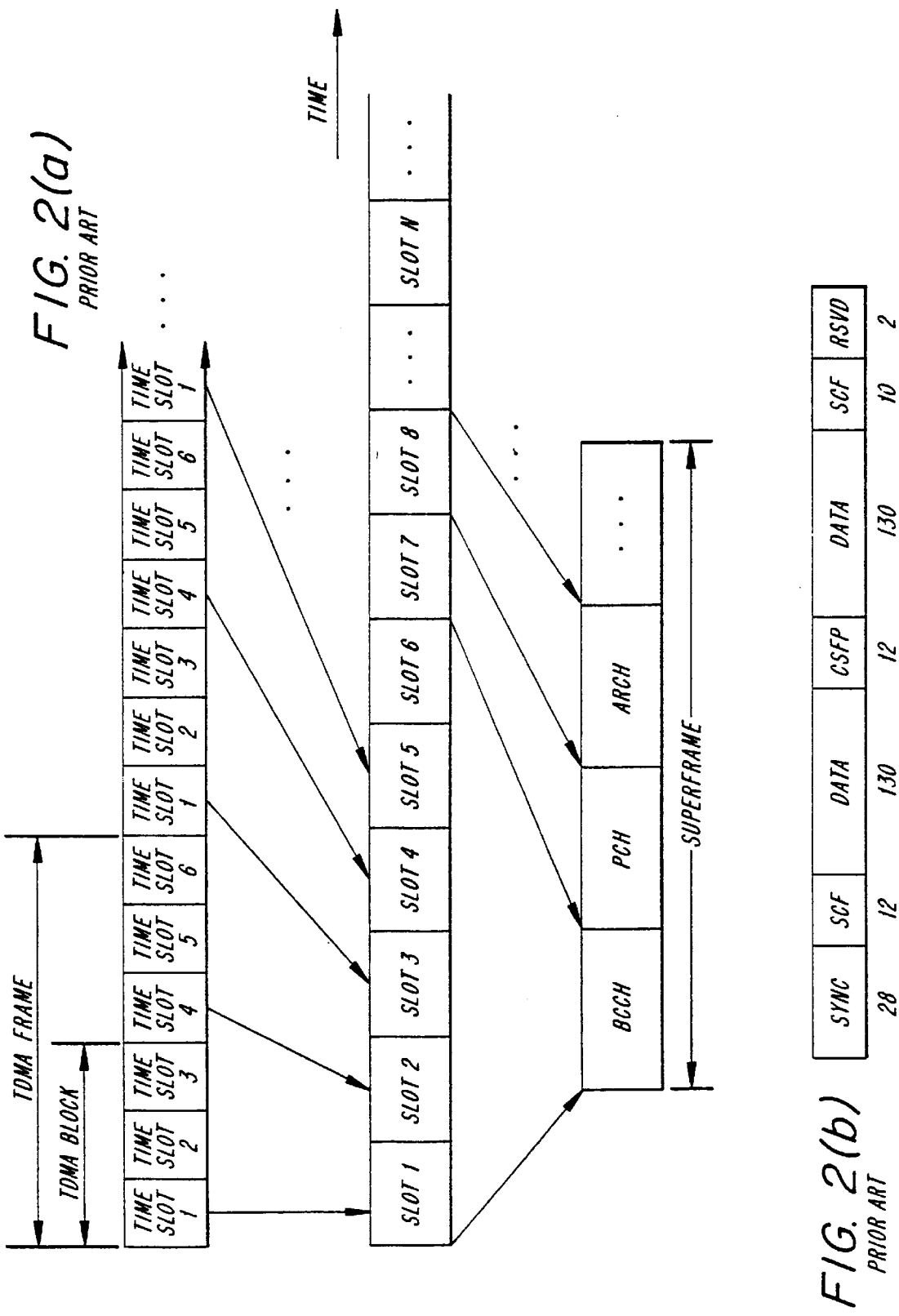
FIG. 2(a) shows a forward DCC configured as a succession of time slots included in the consecutive time slots sent on a carrier frequency.
FIG. 2(b) shows an example of an IS-136 DCCH field slot format.
Figure 3:
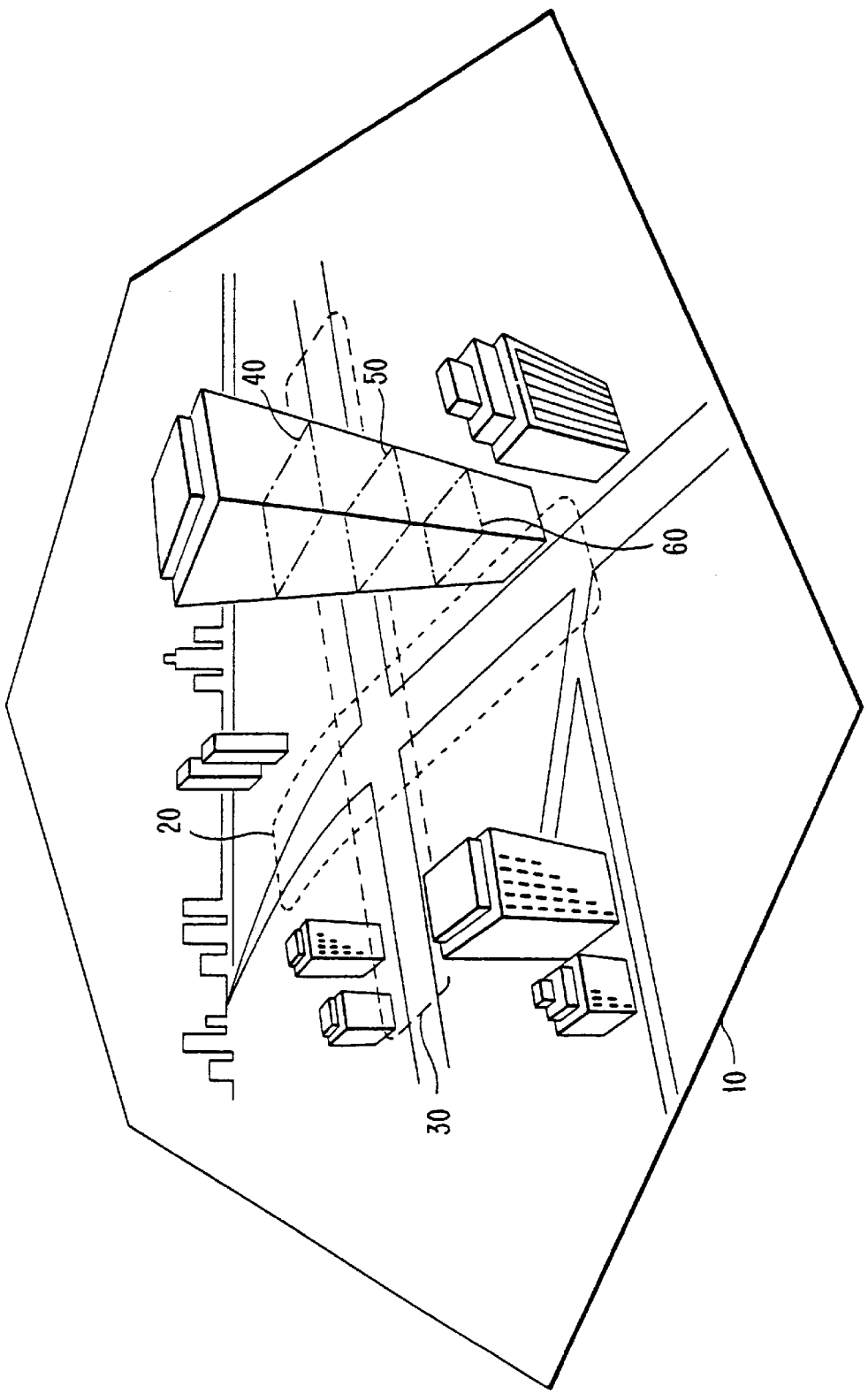
FIG. 3 illustrates an exemplary hierarchical, or multi-layered, cellular system.
Figure 4:
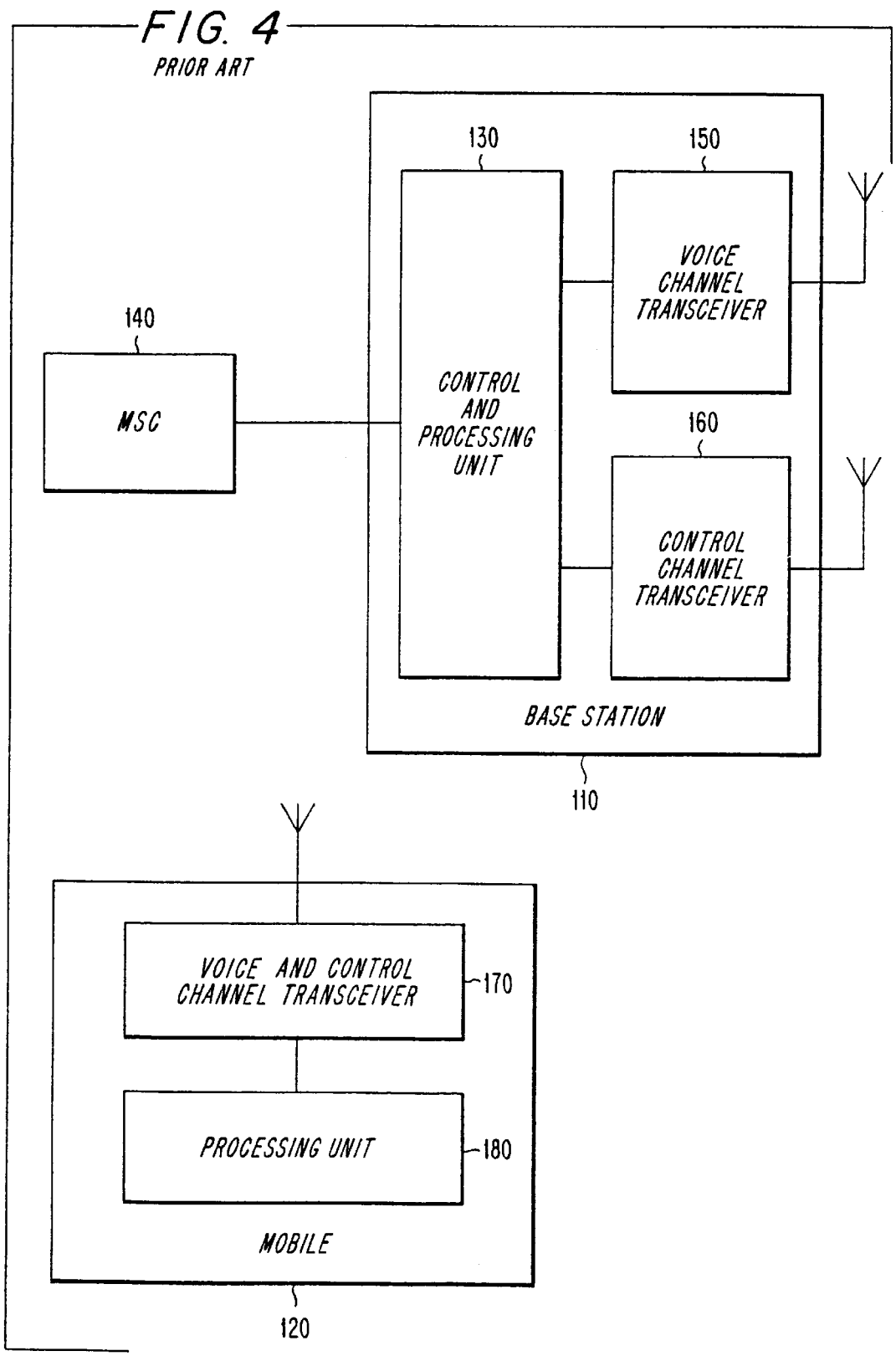
FIG. 4 is a block diagram of an exemplary cellular mobile radiotelephone system, including an exemplary base station and mobile station.
Figure 5:
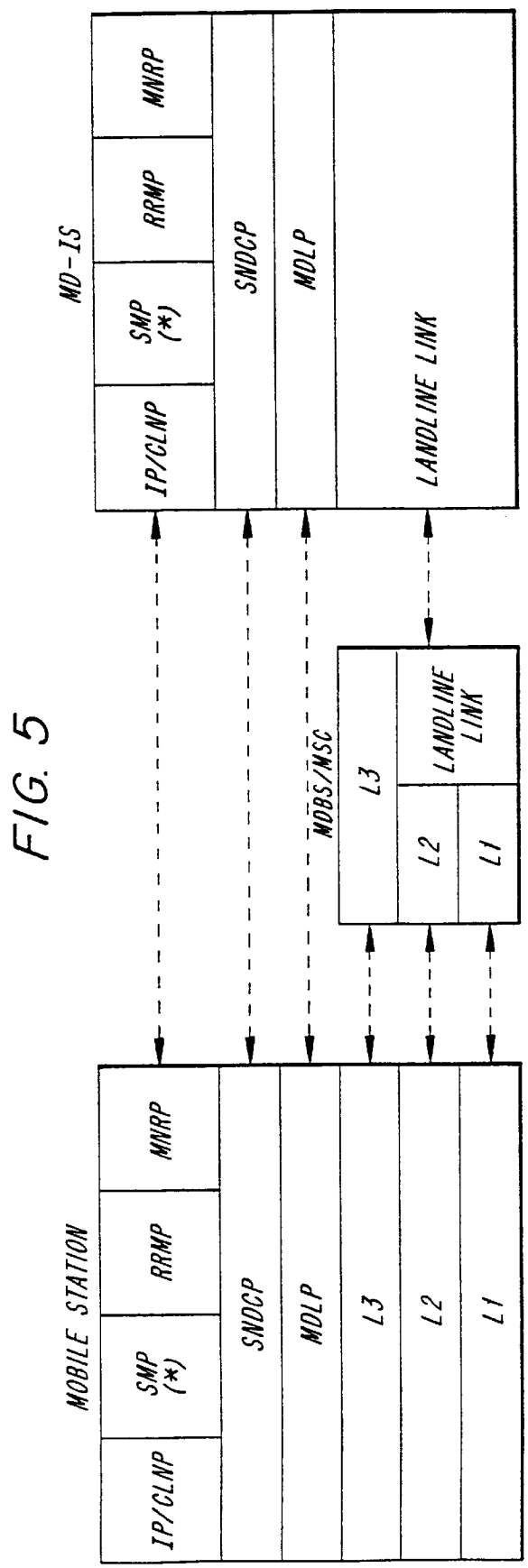
FIG. 5 shows a protocol architecture for communicating across an air link.
Figure 6:
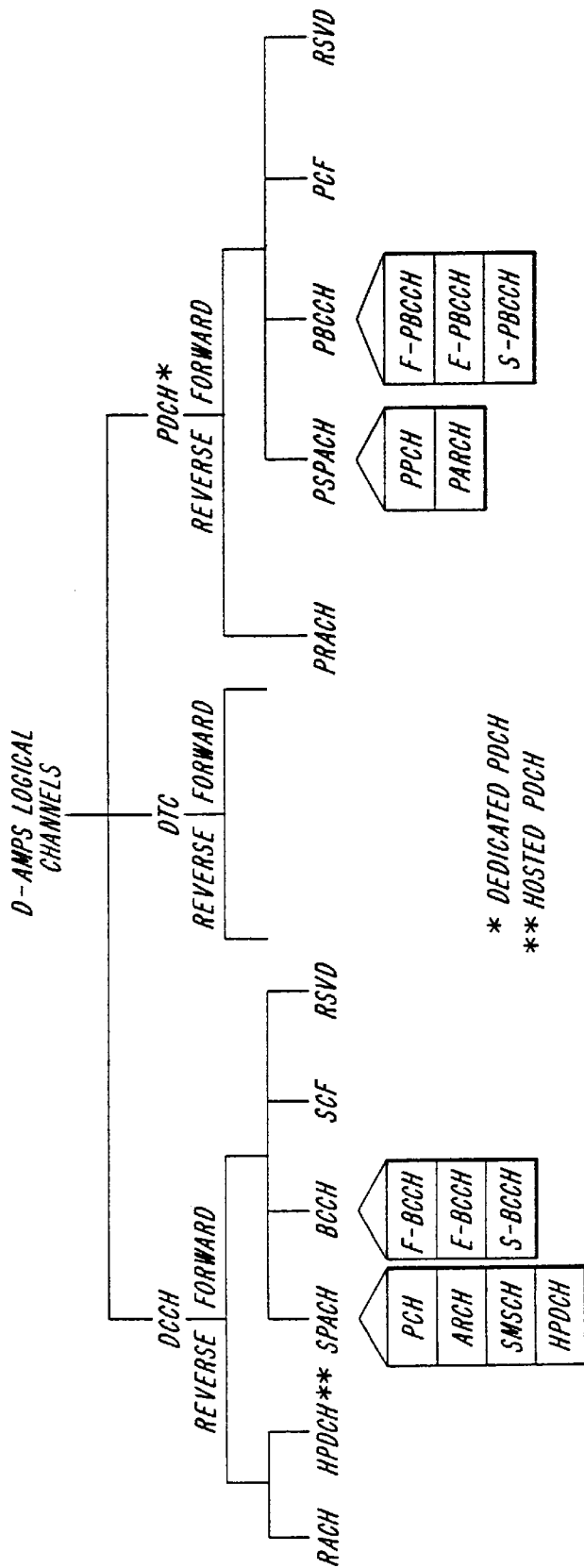
FIG. 6 illustrates logical channels in D-AMPS.

The present invention relates to slot formats for transmissions between a communication system and a mobile station on a packet data channel. To aid in the understanding of the present invention, the structure of the D-AMPS set of logical channels is illustrated in FIG. 6. As illustrated, the digital control channel (DCCH) has a reverse access channel (RACH) in the reverse direction and a broadcast control channel (BCCH), a SPACH channel (paging channel, short message service, access response channel), shared channel feedback (SCF) and a reserved channel (RSVD) in the forward direction. The packet data channel (PDCH) has a packet reverse access channel in the reverse direction and a packet broadcast control channel (PBCCH), a PSPACH channel (packet paging channel PPCH and a packet access response channel PARCH), packet channel feedback (PCF) and a reserved channel in the forward direction.

Figure 7:
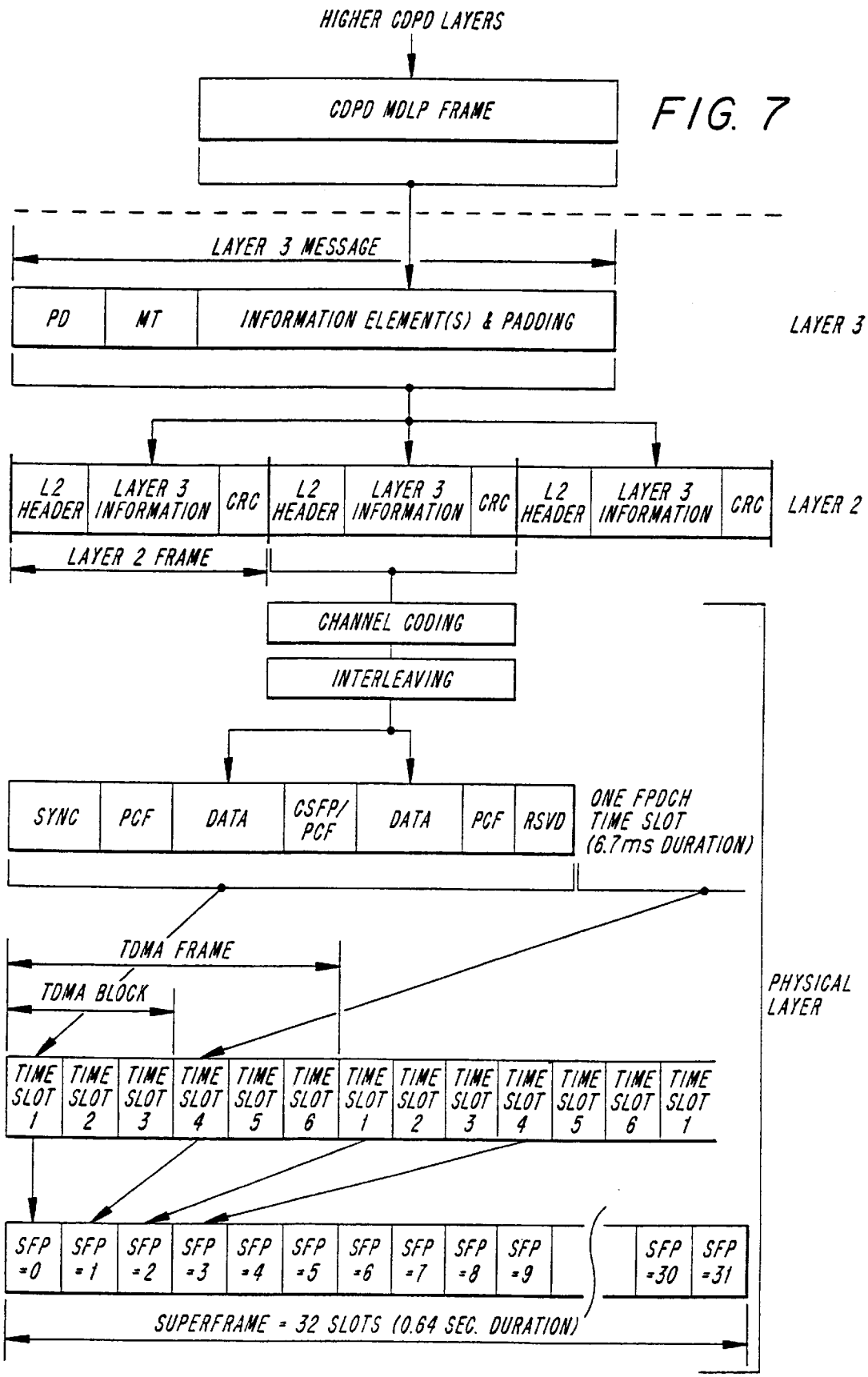
FIG. 7 illustrates one example of a possible mapping sequence.

FIG. 7 shows a dedicated PDCH example of how one layer 3 message is mapped into several layer 2 frames, an example of a layer 2 frame mapping onto a time slot, and an example of a time slot mapping onto a PDCH channel. The length of the FPDCH time slots and the RPDCH bursts are fixed. There are three forms of RPDCH bursts (normal, abbreviated, and auxiliary which have different fixed lengths and the FPDCH slot and the full-rate PDCH are assumed to be on the physical layer in FIG. 8. In the present invention, the TDMA frame structure is the same as for IS-136 DCCH and DTC. In the interest of maximal throughput when a multi-rate channel (double-rate PDCH and triple-rate PDCH) is used, an additional FDPCH slot format is specified.

FIG. 8 illustrates the additional slot format which is provided by this invention. FIG. 8 illustrates a slot format for transmissions between the communication system and a mobile station on a packet data channel. In this embodiment, the slot format is divided into seven fields; a synchronization field (SYNC) for providing synchronization information to the mobile station, a packet channel feedback field (PCF), a first data (DATA) field, a coded superframe phase/packet channel feedback (CSFP/PCF) field, a second data field, a second packet channel feedback (PCF) field, and a reserved (RSVD) field.

The packet channel field is used to control accesses on the RPDCH and is comprised of several flags: Busy/Reserved/Idle (BRI); Received/Not Received (R/N); Partial Echo (PE) as described in IS-136. However, in this invention, the packet channel field also contains a Partial Echo Qualifier (PEQ) flag. The BRI flag is used to indicate whether the RPDCH channel is busy, reserved, or idle. The flag may total six bits in length and is interleaved with the other PCF flags. The R/N flag is used to convey the received/not received status of individual bits sent to the base station on the RPDCH. The partial echo flag is used to indicate which mobile station attempting a connection based access has had its initial burst correctly received by the communication system. In this embodiment, the communication system sets PE equal to the seven least significant bits of the mobile station identity code sent as part of the mobile station access attempt. In addition, the partial echo flag is used to solicit or poll a response from the mobile station while it is in the process of receiving an automatic retrnsmission request mode transmission. In this case, the communication system sets PE equal to the PE assigned (PEA) to the mobile station in the first slot used in support of the transmission.

According to one embodiment of the invention, the CSFP/PCF field is used to convey information regarding the superframe phase so that the mobile stations can find the start of the superframe and to provide the partial echo qualifier information. In one embodiment, the CSFP/PCF field contains 12-bits (D0-D11). The PEQ flag is used by the communication system to dynamically assign the subchannels of the RPDCH so as to provide an efficient means for interrupting the transmission of a first mobile station so as to allow the system to send a short message to another mobile station. The PEQ flag can be assigned two bits within the 12-bit CSFP/PCF field. For example, the PEQ flag can be assigned bits D6 and D5, however the present invention is not limited thereto. The encoding rules for the PEQ flag will now be described and is illustrated in Table 1. When the bits D6 and D5 are set to zero, no sub-channel management activity is defined and the PE flag is unassociated. When bits D6 and D5 are set to zero and one, respectively, sub-channel ownership is interrupted after the first burst of an access attempt and reassigned to the owner of a preceding sub-channel. The PE flag is then associated with the R/N flag. When the bits D6 and D5 are set to one and zero, respectively, the sub-channel ownership is interrupted after the second or a later burst of an access attempt and reassigned to a mobile station with a matching PE. The PE flag is then associated with the BRI flag. Finally, when both of the bits D6 and D5 are set to one, sub-channel ownership is not interrupted after the first burst of an access attempt, and therefore remains assigned to the current sub-channel owner. In this case, the PE flag is associated with both the R/N flag and the BRI flag. It will be appreciated by one skilled in the art that other bit pairs may be used and that this invention is not limited to the bit pair (D6 and D5) described above.

TABLE 1

PEQ ENCODING RULES

| Subchannel Assignment and PE Association | PEQ | $d_6$ | $d_5$ |
|---|---|---|---|
| No subchannel management activity is currently defined for this value of PEQ. PE is unassociated. | RSVD | 0 | 0 |
| Subchannel ownership is interrupted after 1st burst of access attempt and reassigned to owner of preceding subchannel. PE is associated with R/N flag. | $INT_1$ | 0 | 1 |
| Subchannel ownership is interrupted after 2nd or later burst of access attempt and reassigned to mobile station with matching PE. PE is associated with BRI flag. | $INT_2$ | 1 | 0 |
| Subchannel ownership is not interrupted after 1st burst of access attempt and therefore remains assigned to current subchannel owner. PE is associated with R/N and BRI. | NO_INT | 1 | 1 |

The PCF flags are carried in FPDCH time slots and serve to indicate the communication system's reception status of bursts previously transmitted on the RDCCH. The PCF flags are also used to indicate the availability status, i.e., busy/reserved/idle, of their corresponding RPDCH bursts. A mobile station having an access pending reads the PCF flags to determine when to begin it access attempt.

Figure 9:
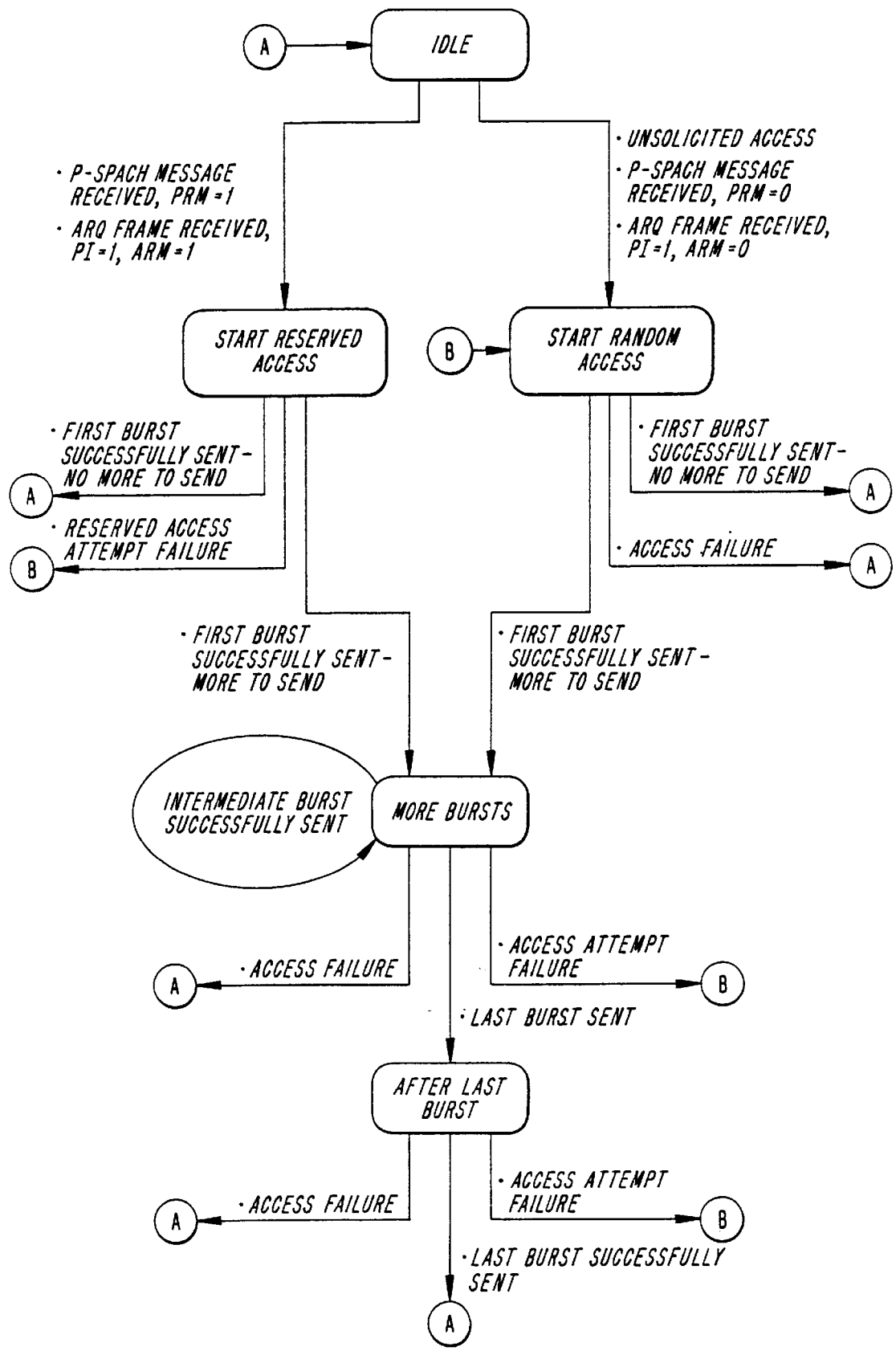
FIG. 9 illustrates a series of sub-states associated with a mobile station processing an access attempt at layer 2.

Whenever layer 3 sends a RPDCH Request primitive to layer 2 or an ARQ Status Frame is solicited by the communication system during an ARQ Mode transaction, the mobile station initiates an access attempt on the RPDCH. The series of sub-states associated with a mobile station processing an access attempt at layer 2 are shown in FIG. 9.

A mobile station is considered to be in the idle state whenever it is not in the process of making an access attempt on the RPDCH. From the idle state, a mobile station can either start a reserved access or a random access. A mobile station enters the Start Random Access state when any of the following conditions occur. A mobile station decides to make an unsolicited system access. A mobile station is required to make a solicited system access as a result of successfully receiving a complete FPDCH message with SRM=0. A mobile station is required to make a solicited system access as a result of an ARQ mode transaction where the mobile station receives an ARQ frame with PI=1 and ARM=0. A mobile station is required to make a solicited system access as a result of receiving a R/N=Not Received after sending the first burst of a reservation based access attempt.

A mobile station enters the Start Reserved Access state when any of the following conditions occur. 100 ms after a mobile station successfully receives the last L2 frame of a PSPACH message where SRM=1 in all L2 frames used in sending the PSPACH message and where the received PSPACH message solicits a mobile station response on the RDCCH. Immediately after a mobile station successfully receives an ARQ Mode BEGIN Frame or an ARQ Mode CONTINUE Frame having PI=1 and ARM=1.

A mobile station enters the More Bursts state if, after successfully transmitting the first burst of its access attempt, there are one or more additional bursts still requiring transmission. A mobile station remains in the More Bursts state until it has transmitted all bursts of its access attempt but is still awaiting PCF feedback for at least its last transmitted burst. The mobile station may, however, be awaiting PCF feedback for more than its last transmitted burst because of dynamic RPDCH subchannel allocation. If dynamic RPDCH subchannel assignments are made during an access attempt then this may result in bursts being received out of order at the communication system. The last transmitted burst is therefore not necessarily the burst containing the last layer 2 frame initially formatted as a result of receiving layer 3 information within a RPDCH Request primitive.

The following procedures are used in making contention or reservation based access attempts on the PPDCH. These procedures are subject to the Random Access parameters included in an Access Parameters message sent on the F-PBCCH, and are summarized in Table 2.

TABLE 2

RANDOM ACCESS PARAMETERS

| BCCH Parameter Names | Range of Parameters |
|---|---|
| Max Busy/Reserved | 0, 1 |
| Max Retries | 0–7 |
| Max Repetitions | 0–3 |
| Max Stop Counter | 0, 1 |

As set forth above, a mobile station can attempt to make an access on either a contention or reservation basis. An access is only attempted after a mobile station has read the Access Parameters message on the F-PBCCH. For any given access, a mobile station is allowed a maximum of Max Retries+1 access attempts before declaring the access to have failed. A given access attempt is considered to have failed if the mobile station does not decode BRI as Idle after one attempt (Max Busy/ Reserved=0) or 10 attempts (Max Busy/Reserved=1) or the mobile station does not find a PE match along with R/N=Received after sending the first burst of a contention based access attempt. In addition, the access attempt is considered to have failed if the mobile station does not successfully send any given burst after Max Repetitions repeated transmission of that burst, or the mobile station detects a total of Max Stop Counter+1 consecutive occurrences of any of the PCF conditions that result in Stop_ctr being incremented.

After failing its initial access attempt a mobile station proceeds in the following manner. If Max Retries=0, the mobile station considers the access to have failed. If Max Retries=1, the mobile station applies a uniformly distributed first random delay with a granularity of 1 TDMA block before making its next access attempt. If Max Retries>1, the mobile station applies a uniformly distributed second random delay with a granularity of 1 TDMA block before making its second access attempt. IF Max Retries>1, the mobile station applies a uniformly distributed third random delay with a granularity of 1 TDMA block before making its third or later access attempt.

If a mobile station attempts a random access in order to send a Page Response as a result of receiving a Triple Page Frame or a Variable Page Frame with a matching MSID the mobile station first applies a uniformly distributed random delay, which is dependent on the channel rate, with a granularity of 1 TDMA block before looking for BRI=Idle.

If a mobile station attempts a random access for any other reason and P_overload_status is set the mobile station first applies a uniformly distributed random delay with a granularity of 1 TDMA block before looking for BRI=Idle. A mobile station then looks for BRI=Idle on all FPDCH slots of its current PDCH that it decides to read according to its bandwidth preference. After failing to read BRI=Idle during any given access attempt, a mobile station determines whether or not to continue its current access attempt based on Max Busy-Reserved. If the mobile station continues it current access attempt, it applies a uniformly distributed random delay with a granularity of 1 TDMA block before once again lolling for BRI=Idle.

Upon finding a FPDCH slot with BRI=Idle, a mobile station sends the first burst of its access attempt using the corresponding RPDCH subchannel. The mobile station then reads the PCF corresponding to its first transmitted burst and respond to the received PE value in the following manner. If a PE match does not occur, the mobile station considers the access attempt to have failed, increments Rtr_ctr and then determines whether or not to make another access attempt based on Max Retries. If a PE match occurs and there are not more bursts to send, the mobile station proceeds according to Table 1. If a PE match occurs and there are more bursts to send, the mobile station proceeds according to Table. 4

TABLE 3

RANDOM ACCESS - NO MORE BURSTS

| BRI | R/N | PEQ | Mobile Station Response |
|---|---|---|---|
| X | R | X | Consider the access attempt as successfully completed and enter the Idle state. |
| B | N | X | Increment Rep_ctr and Rtr_ctr and consider the access attempt to have failed. Note that the initialization of Rep_ctr results in immediately declaring an access attempt to have failed when this condition occurs. |
| R,I | N | X | Increment Stop_ctr, Rep_ctr and Rtr_ctr, and consider the access attempt to have failed. Note that the initialization of Stop_ctr and Rep_ctr results in immediately declaring an access attempt to have failed when this condition occurs. |

TABLE 4

RANDOM ACCESS - MORE BURSTS

| BRI | R/N | PEQ | Mobile Station Response |
|---|---|---|---|
| B | R | RSVD or $INT_2$ | Increment Rep_ctr and Rtr_ctr, and consider the access attempt to have failed. Note that the initialization of Rep_ctr results in immediately declaring an access attempt to have failed when this condition occurs. |

TABLE 4-continued

RANDOM ACCESS - MORE BURSTS

| BRI | R/N | PEQ | Mobile Station Response |
|---|---|---|---|
| B | R | $INT_1$ | Increment Burst_ctr, consider the RPDCH subchannel corresponding to its current PCF as unassigned, enter the More Bursts state and invoke the More Bursts procedure. |
| B | R | No_INT | Increment Burst_ctr, send the next burst of the current access attempt using the RPDCH subchannel corresponding to its current PCF, enter the More Bursts state and invoke the More Bursts procedure. |
| B | N | X | Increment Rep_ctr and Rtr_ctr, and consider the access attempt to have failed. Note that the initialization of Rep_ctr results in immediately declaring an access attempt to have failed when this condition occurs. |
| R,I | X | X | Increment Stop_ctr, Rep_ctr and Rtr_ctr, and consider the access attempt to have failed. Note that the initialization of Stop_ctr and Rep_ctr results in immediately declaring an access attempt to have failed when this condition occurs. |

When soliciting a reservation based access, the specific FPDCH slot selected by the communication system for sending CPE and BRI information is completely independent of which RPDCH subchannel the mobile station may have previously used. A mobile station in the Start Reserved Access state will have specific knowledge regarding when to start a reserved access for receiving an ARQ Mode BEGIN or ARQ Mode CONTINUE frame with PI=1, ARM=1 and BRI=Reserved within the same FPDCH slot as the received ARQ frame. In this case, the mobile station sends the first burst of its access attempt using the RPDCH subchannel corresponding to the FPDCH slot in which it received the ARQ Mode BEGIN and ARQ Mode CONTINUE frame.

A mobile station in the start Reserved Access state that does not have specific knowledge regarding when to start a reserved access (e.g., BRI≠ Reserved when an ARQ Mode BEGIN frame is received with PI=1 and ARM=1), looks at the FPDCH slots of all RPDCH subchannels it is capable or reading in an effort to find a PE match. If the mobile station does not find a PE match along with BRI=Reserved within 8 TDMA blocks when attempting to send an ARQ STATUS frame on a reservation basis, the mobile station enters the Start Random Access state and invokes the Start Random Access procedure. If the mobile station does not find a PE match along with BRI=Reserved within 32 TDMA blocks when attempting to start sending a layer 3 message on a reservation basis, the mobile station enters the Start Random Access state and invokes the Start Random Access procedure. If the mobile station finds a PE match along with the BRI=Reserved within the expected timeframe, the mobile station sends the first burst of its access attempt (if staring an access attempt) or the next burst of its access attempt (if resuming an interrupted access attempt) using the next occurrence of the RPDCH subchannel corresponding to FPDCH slot in which the PE match and BRI=Reserved were detected.

The mobile station then reads the PCF corresponding to its first transmitted burst. If there are no more bursts to send the mobile station proceeds according to Table 5 based upon the specific PCF information. If there are more bursts to send, the mobile station proceeds according to Table 6 based upon the specific PCF information.

TABLE 5

RESERVED ACCESS - NO MORE BURSTS

| BRI | R/N | PEQ | Mobile Station Response |
|---|---|---|---|
| X | R | X | Consider the access attempt as successfully completed and enter the Idle state. |
| B | N | X | Increment Rep_ctr and determine whether or not to continue its current access attempt based on Max Repetitions. If the mobile station continues its current access attempt, it resends its current burst using the RPDCH subchannel corresponding to its current PCF. Otherwise, the mobile station increments Rtr_ctr and considers its access attempt to have failed. |
| R,I | N | X | Increment Stop_ctr, Rep_ctr and Rtr_ctr, and consider the access attempt to have failed. Note that the initialization of Stop_ctr results in immediately declaring an access attempt to have failed when this condition occurs. |

TABLE 6

RESERVED ACCESS - MORE BURSTS

| BRI | R/N | PEQ | Mobile Station |
|---|---|---|---|
| B | R | X | Increment Burst_ctr, send the next burst of the current access attempt using the RPDCH subchannel corresponding to its current PCF, enter the More Bursts state and invoke the More Bursts procedure. |
| R | R | INT$_2$ | Increment Burst_ctr, consider the RPDCH subchannel corresponding to its current PCF as unassigned, enter the More Bursts state and invoke the More Bursts procedure. |
| R | R | RSVD INT$_1$ or NO_INT | Increment Stop_ctr, Rep_ctr and Rtr_ctr, and consider the access attempt to have failed. Note that the initialization of Stop_ctr results in immediately declaring an access attempt to have failed when this condition occurs. |
| B | N | X | Increment Rep_ctr and determine whether or not to continue its current access attempt based on Max Repetitions. If the mobile station continues its current access attempt, it resends its current burst using the RPDCH subchannel corresponding to its current PCF. Otherwise, the mobile station increments Rtr_ctr and considers its access attempt to have failed. |
| R | N | INT$_2$ | Increment Rep_ctr and determine whether or not to continue its current access attempt based on Max Repetitions. If the mobile station continues its current access attempt, it remains in the Start Reserved Access state. Otherwise, the mobile station increments Rtr_ctr and considers its access attempt to have failed. |
| R | N | RSVD INT$_1$ or NO_INT | Increment Stop_ctr, Rep_ctr and Rtr_ctr, and consider the access attempt to have failed. Note that the initialization of Stop_ctr results in immediately declaring an access attempt to have failed when this condition occurs. |
| I | X | X | Increment Stop_ctr, Rep_ctr and Rtr_ctr and consider the access attempt to have failed. Note that the initialization of Stop_ctr results in immediately declaring an access attempt to have failed when this condition occurs. |

After transmitting the first burst of its access attempt and responding to its associated PCF according to Table 4 or Table 6, and more bursts need to be sent, a mobile station begins examining the FPDCH slots for all RPDCH subchannels on the PDCH that it is capable of operating on. The mobile station starts examining the PCF of these additional FPDCH slots immediately after reading the FPDCH slot containing the PCF corresponding to its first transmitted burst. The mobile station responds to PCF information read in these additional FPDCH slots in the following manner. Upon reading a FPDCH slot for a currently associated RPDCH subchannel carrying PCF information for a previously transmitted burst, a mobile station responds as indicated in Table 7 based upon the specific PCF information. Upon reading a FPDCH slot for a currently unassigned RPDCH subchannel, a mobile station responds as indicated in Table 8 based upon the specific PCF information. A mobile station that has one or more bursts requiring transmission and that currently has no assigned RPDCH subchannels, considers its current access attempt to have failed if it does not receive a RPDCH subchannel assignment within 32 TDMA blocks of PCF examination.

TABLE 7

MORE BURSTS - PCF FOR ASSIGNED SUBCHANNEL

| BRI | R/N | PEQ | Mobile Station Response |
|---|---|---|---|
| B | R | X | Increment Burst_ctr and send the next burst of its current access attempt using the RPDCH subchannel corresponding to its current PCF. Upon sending the last burst of its access attempt a mobile station enters the After Last Burst state and invokes the After Last Burst procedure. |
| R | R | INT$_2$ | Increment Burst_ctr and consider the RPDCH subchannel corresponding to its current PCF as unassigned. |
| R | R | RSVD INT$_1$ or NO_INT | Increment Stop_ctr and Rep_ctr, and then determine whether or not to continue its current access attempt based on Max Stop Counter. If the mobile station continues its current access attempt, it resends its current burst using the RPDCH subchannel corresponding to its current PCF. Otherwise, the mobile station increments Rtr_ctr and considers its access attempt to have failed. |
| I | R | RSVD | Increment Burst_ctr and consider the RPDCH subchannel corresponding to its current PCF as unassigned. |
| I | R | INT$_1$ INT$_2$ or NO_INT | Increment Stop_ctr and Rep_ctr, and then determine whether or not to continue its current access attempt based on Max Stop Counter. If the mobile station continues its current access attempt, it resends its current burst using the RPDCH subchannel corresponding to its current PCF. Otherwise, the mobile station increments Rtr_ctr and considers its access attempt to have failed. |
| B | N | X | Increment Rep_ctr and determine whether or not to continue its current access attempt based on Max Repetitions. IF the mobile station continues its current access attempt, it resends its current burst using the RPDCH subchannel corresponding to its current PCF. Otherwise, the mobile station increments Rtr_ctr and considers its access attempt to have failed. |
| R | N | INT$_2$ | Consider the RPDCH subchannel corresponding to its current PCF as unassigned. |
| R | N | INT$_1$ or NO_INT | Increment Stop_ctr and Rep_ctr, and then determine whether or not to continue its current access attempt based on Max Stop Counter. If the mobile station continues its current access attempt, it resends its current burst using the RPDCH subchannel corresponding to its current PCF. Otherwise, the mobile station increments Rtr_ctr and considers its access attempt to have failed. |
| I | N | RSVD | Consider the RPDCH subchannel corresponding to its current PCF as unassigned. |
| I | N | INT$_1$ INT$_2$ or | Increment Stop_ctr and Rep_ctr, and then determine whether or not to continue its current access attempt based on Max Stop Counter. If the mobile |

TABLE 7-continued

MORE BURSTS - PCF FOR ASSIGNED SUBCHANNEL

| BRI | R/N | PEQ | Mobile Station Response |
|---|---|---|---|
| | | NO_INT | station continues its current access attempt, it resends its current burst using the RPDCH subchannel corresponding to its current PCF. Otherwise, the mobile station increments Rtr_ctr and considers its access attempt to have failed. |

TABLE 8

MORE BURSTS - PCF FOR UNASSIGNED SUBCHANNEL

| BRI | R/N | PEQ | Mobile Station Response |
|---|---|---|---|
| B | X | $INT_1$ | If a mobile station receives these PCF values in the first FPDCH slot (master or slave) following the FPDCH slot used to carry the PCT for the first burst of its current access attempt, the mobile station considers the associated RPDCH subchannel as assigned to it. The mobile station then increments Burst_ctr and sends the next burst of its access attempt using this RPDCH subchannel. Upon sending the last burst of its access attempt, a mobile station enters the After Last Burst state and invokes the After Last Burst procedure. |
| B | X | $INT_2$ or NO_INT | Ignore the current FPDCH slot. |
| R | X | $INT_2$ | A mobile station rends the PE also received in the current FPDCH slot. If a PE match does not occur, the mobile station ignores the current FPDCH slot. If a PE match does occur, the mobile station considers be RPDCH subchannel associated with the current PCF as assigned to it, increments Burst_ctr and sends the next burst of its access attempt using this RPDCH subchannel. Upon sending the last burst of its access attempt, a mobile station enters the After Last Burst state and invokes the After Last Burst procedure. |
| R | X | $INT_1$ or NO_INT | Ignore the current FPDCH slot. |
| I | X | X | Ignore the current FPDCH slot. |

After sending or resending the last burst of its access attempt, a mobile station waits for PCF feedback for its outstanding burst transmissions on all RPDCH subchannels it currently considers as assigned to it. Upon receiving PCF feedack on any of its assigned subchannels the mobile station responds according to Table 9.

TABLE 9

AFTER LAST BURST - PCF FOR ASSIGNED SUBCHANNEL

| BRI | R/N | PEQ | Mobile Station Response |
|---|---|---|---|
| X | R | X | If all outstanding burst transmission have been confirmed as received according to PCF feedback, the mobile Station considers its current access attempt as successfully completed and immediately begins looking for a response to its access on the PARCH. Otherwise, the mobile station remains in the After Last Burst state. |
| B | N | X | Increment Rep_ctr and determine whether or not to continue its current access attempt based on Max Repetitions. If the mobile station continues its current access attempt, it resends its current burst using the RPDCH subchannel corresponding |

TABLE 9-continued

AFTER LAST BURST - PCF FOR ASSIGNED SUBCHANNEL

| BRI | R/N | PEQ | Mobile Station Response |
|---|---|---|---|
| | | | to its current PCF. Otherwise, the mobile station increments Rtr_ctr and considers its access attempt to have failed. |
| R | n | $INT_2$ | Consider the RPDCH subchannel corresponding to its current PCF as unassigned, enter the More Bursts state and invoke the More Bursts procedure. |
| R | N | $INT_1$ or NO_INT | Increment Stop_ctr and Rep_ctr, and then determine whether or not to continue its current access attempt based on Max Stop Counter. If the mobile station continue its current access attempt, it resends its current burst using the RPDCH subchannel corresponding to its current PCF. Otherwise, the mobile station increments Rtr_ctr and considers its access attempt to have failed. |
| I | N | RSVD | Consider the RPDCH subchannel corresponding to its current PCF as unassigned, enter the More Bursts stat and invoke the More Bursts procedure. |
| I | N | $INT_1$ $INT_2$ or NO_INT | Increment Stop_ctr and Rep_ctr, and then determine whether or not to continue its current access attempt based on Max Stop Counter. If the mobile station continues its current access attempt, it resends its current burst using the RPDCH subchannel corresponding to its current PDF. Otherwise, the mobile station increments Rtr_ctr and considers its access attempt to have failed. |

If a mobile station decides to resend the last burst of its current access attempt, the mobile station immediately begins looking for its expected PARCH response starting with the next FPDCH slot, i.e., the FPDCH slot following the FPDCH slot from which it read PCF information that resulted in its decision to resend the last burst. If the mobile station receives is expected PARCH response prior to successfully resending its last burst, the mobile station considers the access attempt to be successfully completed. A method station that considers its access attempts to have failed (after attempting to resend the last burst) immediately stops looking for its expected PARCH response.

Figure 10:
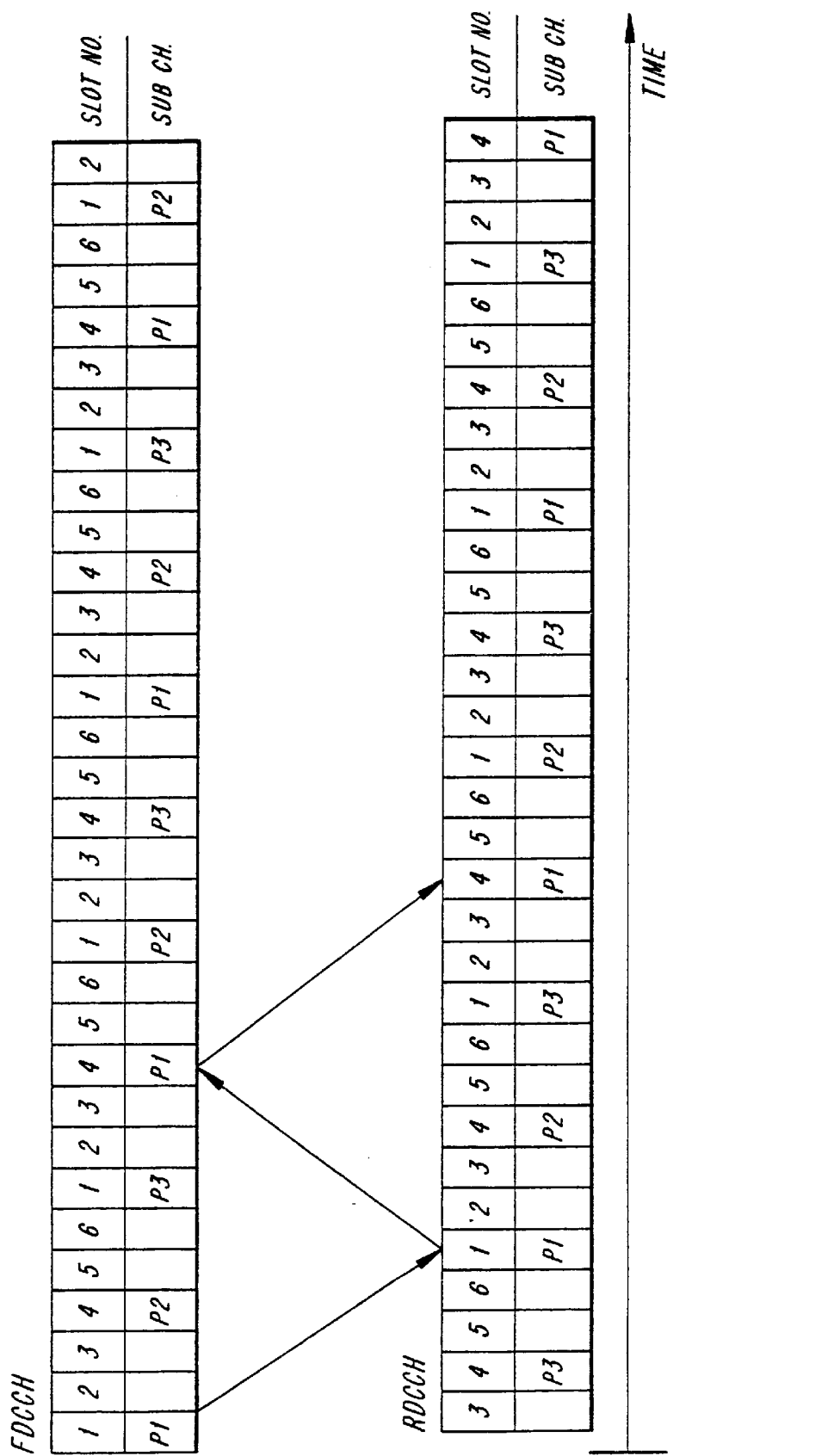
FIG. 10 illustrates the RPDCH subchannels that are used in a full-rate PDCH.

In a full-rate PDCH, the RDCCH bursts and the PDCCH slots are multiplexed so as to create three distinct access paths as illustrated in FIG. 10. Assuming that path 1 (P1) in the FDCCH indicates that the next P1 burst in the RDCCH is available, i.e., idle, and is selected for an access attempt, a mobile station sends the first burst of its access at that time after receiving the full P1 slot in the FDCCH. The mobile station then begins reading the PCF flags in the next P1 FDCCH slot after completing transmission of its access burst to determine whether or not the communication system received the mobile station's initial burst.

Figure 11:
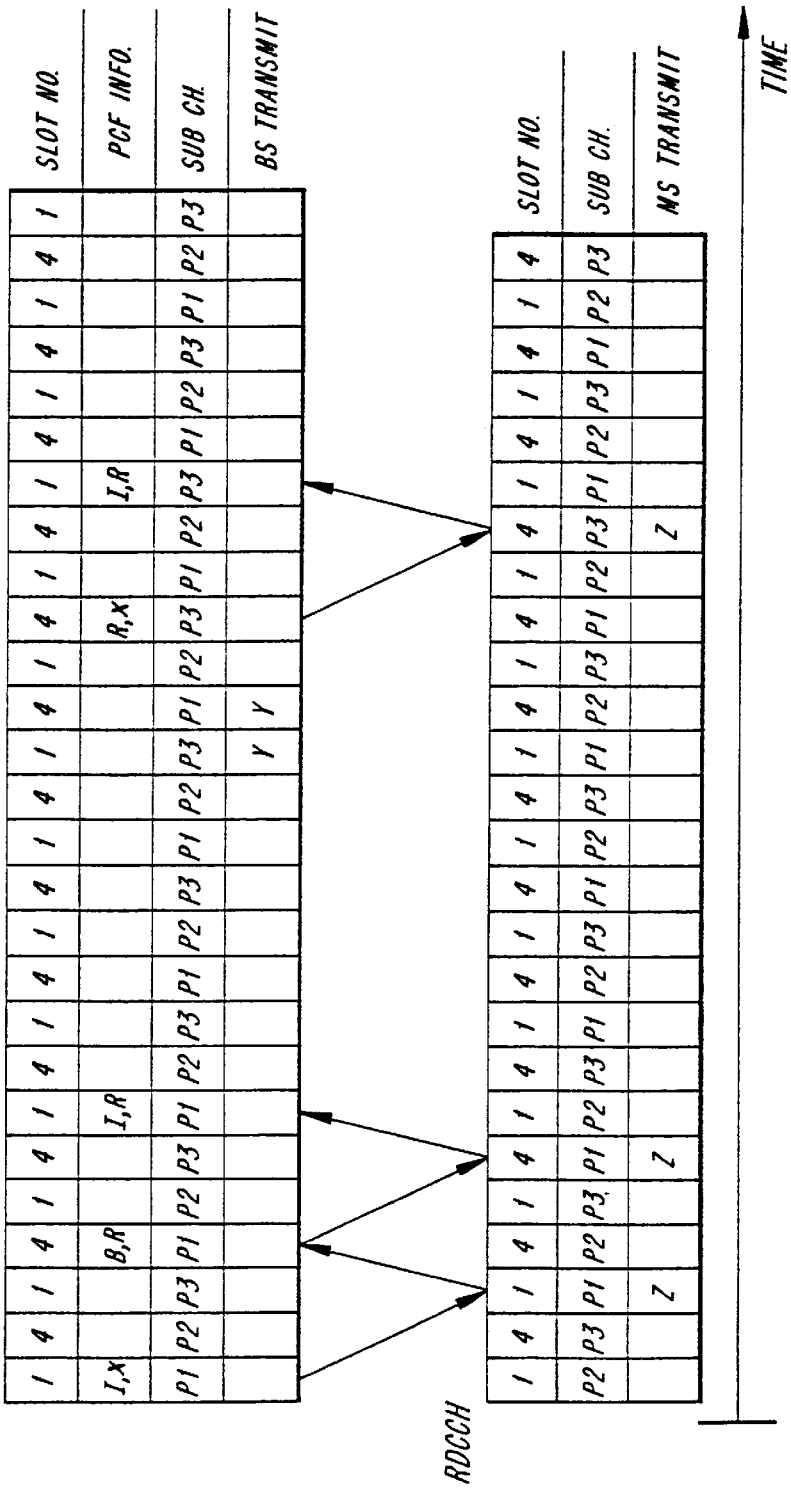
FIG. 11 illustrates an example of a dialogue between a mobile station and a communication system.

FIG. 11 illustrates the relationship between FDCCH PCF flags and RDCCH bursts, wherein a mobile station makes a contention-based access and transmits a total of two bursts. The arrows show the order or events associated with the access attempt. Thus, following the arrows from left to right on RPDCH sub-channel P1, the BRI portion of the PCF flag first indicates the availability of the next P1 burst in the RDCCH. If a burst is transmitted in the RDCCH burst, then the mobile station reads the R/N portion of the PCF flags in the next P1 FDCCH slot to determine whether the communication system successfully received the mobile station's transmitted burst. For the first burst of a random access, the mobile station also reads the PE portion of the PCF flags to determine whether or not the mobile station's particular access was captured. The communication system sets the value of the PE flag to reflect the captured mobile station access, for example, the value of the PE flag can be set to reflect at least part of the mobile station's identification code. If the mobile station determines that it's access was captured based on the PE flag and that the R/N flag indicates that the burst was received, the mobile station proceeds to send any additional bursts it has pending beginning with the next P1 burst in the RDCCH.

As set forth above, the PCF flags provide information to a mobile station regarding when the mobile station is allowed to transmit, when the mobile station is requested to transmit, the communication status of a previously transmitted burst, and partial echo association. Since the PDCH channel may be a multi-rate channel (full-rate, double-rate, and triple-rate), many mobile stations may be operating on the channel using different rates. The PCF operation is the same for all mobile transmission rates. Thus, the multi-rate PDCCH is not partitioned into dedicated bandwidth for full-rate, double rate, and triple rate transmissions.

Figure 12:
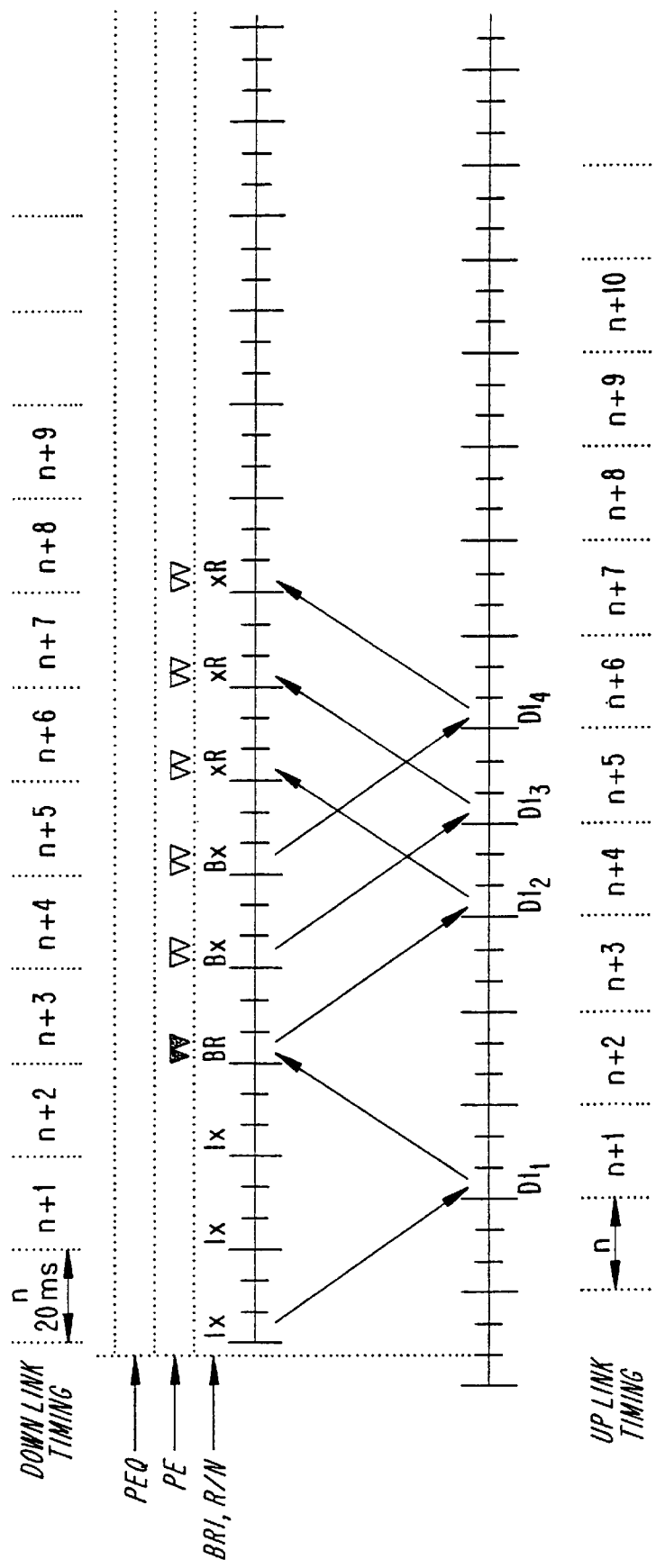
FIG. 12 illustrates one mobile station communication of a full-rate PDCH.
Figure 13:
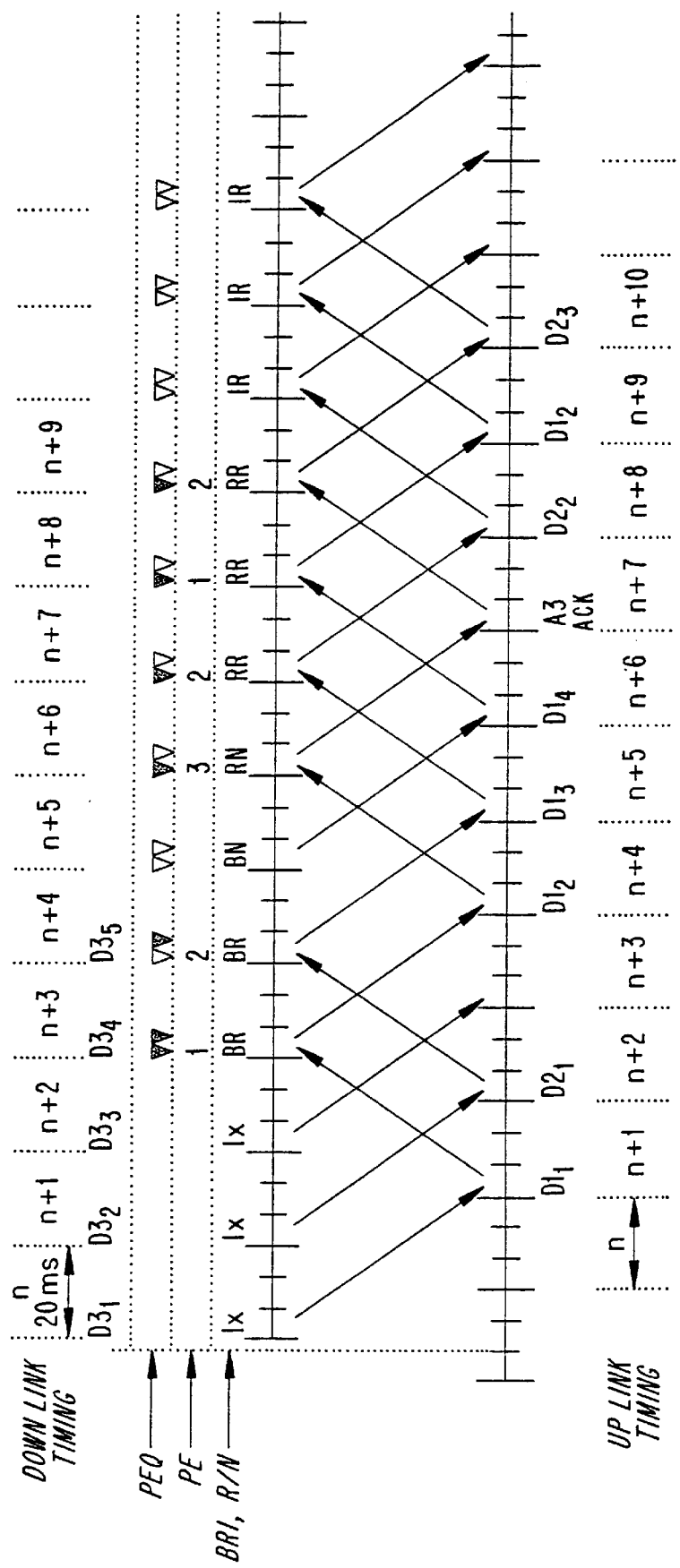
FIG. 13 illustrates three mobile stations communicating on a full-rate PDCH.
Figure 14:
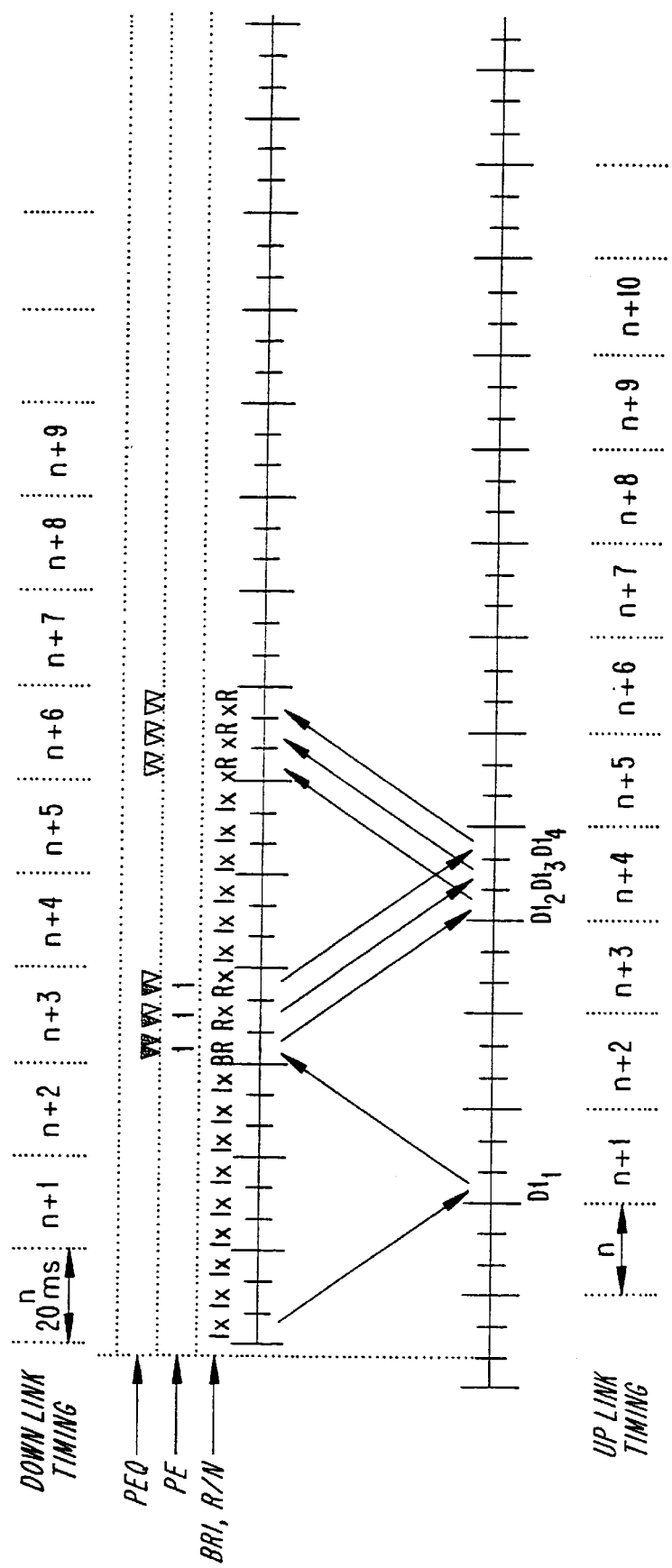
FIG. 14 illustrates one mobile station communicating on a triple-rate PDCH.

FIGS. 12–14 provide several graphical illustrations of the functionality of the PEQ flag. It will be apparent to one skilled in the art that these illustrations are examples of this invention and that this invention is not limited to just these illustrations. In FIGS. 12–14, a PEQ marker is used to illustrate the association or non-association of the PE flag with BRI and/or R/N as determined by the PEQ flag. In the following, the Busy conditions are defined as 1). Busy after random access, and 2) "Continued Busy" when a random access burst has been successfully received, the communication system indicates that the BRI flag is set to Busy, the R/N flag is set to received and the PEQ flag indicates PE associated with both R/N and BRI. In addition, the next uplink slot on the same access path is reserved for the mobile station to send the second burst. In the Continued Busy condition, the BRI flag is set to Busy without PE association so as to allow a mobile station to send additional bursts on the same full-rate slot on which it received a Busy indication after a random access. PE assocation is not required in this case since the Continued Busy condition implicitly refers to the mobile station that received the Busy indication in the first place, after a random acces on this slot.

FIG. 12 illustrates an example of one mobile station's communications on a full-rate PDCH. At down-link time n, the mobile station MS1 detects an idle condition wherein the BRI flag is set to idle. At down-link time n+1, the base station sets the channel to idle and no mobile stations are in the process of acquiring the channel. At up-link time n+1, the mobile station MS1 sends its first burst $D1_1$. At down-link time n+2, the base station sets the channel to idle. At downlink time n+3, the base station having received the first burst $D1_1$ correctly, determines by a length indicator within the burst that the complete data transfer comprises four bursts. As a result, the base station sets the BRI flag to busy and the R/N flag to received. Furthermore, the base station sets the PEQ flag to 1, 1 so that the PE is associated with the R/N and BRI flags. At up-link time n+4, the continued busy condition is detected by the mobile station MS1. The mobile station MS1 then begins examining the FPDCH slots for all RPDCH subchannels that the mobile station is capable of operating on and sends its remaining bursts $D1_2$, $D1_3$, and $D1_4$ on slots having BRI=busy. At down-link time n+4 and n+5, the base station indicates that the channel is busy. At down-link time n+6, the base station indicates that the burst $D1_2$ has been received. No PE association is needed since the slot was reserved for the mobile station MS1. At down-link time n+7, the base station indicates at the burst $D1_3$ has been received, and again no PE association is needed since the slot was reserved for the mobile station MS1. Finally, at down-link time n+8, the base station indicates that the burst $D1_4$ has been received and again no PE association is needed since the slot was reserved for the mobile station MS1. Thus, all four bursts have been successfully received by the base station.

FIG. 13 illustrates an example of three mobile stations communicating on a full-rate PDCH. At downlink time n, the base station sends a first burst D3, to a third mboile station, MS3. In addition, a first mobile station MS1 detects an idle condition, while at downlink time n+1, a second mobile station MS2 detects the idle condition. Furthermore, at downlink time n+1, the base station sends a second burst $D3_2$ to the third mbile station MS3. At up-link time n+1, the first mobile station MS1 sends its first burst $D1_1$ to the base station. At downlink time n+2, the base station sends a third burst to the third mobile station MS3 and sets the channel to idle. At down-link time n+3, the base station sends a fourth burst to the third mobile station MS1. In addition, the base station having received the first burst correctly from MS1 determines by a length indicator within the burst that the complete transfer comprises four bursts. As a result, the base station responds by setting the BRI flag to busy and the received/not received flag to received. In addition, the base station sets the PEQ flag to 1,1 indicating that PE association is with both the BRI and R/N flags. At up-link timing n+2, the second mobile station MS2 sends its first burst $D2_1$. At downlink time n+4, the base station sends a fifth burst to the third mobile station MS3. In addition, the base station puts the second mobile station MS2 on hold by setting the R/N flag to received, the PE flag is set to PE assigned of the second mobile station, and the BRI flag is set to busy. In addition, the PEQ flag is set to 0,1 indicating that the PE is associated with the R/N flag. This PCF setting also indicates that the first mobile station MS1 should transmit. At up-link times n+4, n+5, and n+6, the continued busy condition is detected by the first mobile station. As a result, the mobile station sends its remaining bursts $D1_2$, $D1_3$, and $D1_4$ on slots having the BRI flag set to busy. At down-link time n+5, the base station indicates BRI=busy for the last burst $D1_4$ from MS1. At down-link time n+6, the base station indicates that burst $D1_2$ was not received by setting the R/N flag to not received. No PE association is needed since the slot was reserved for the first mobile station. In addition, the base station reserves a slot by setting the BRI flag to reserve for a third mobile station MS3 to acknowledge a forward link transfer of bursts $D3_1$, $D3_2$, . . . $D3_5$. At down-link time n+7, the base station indicates that the burst $D1_3$ was received by setting the R/N flag to received. In addition, the base station reserves a slot by setting the BRI flag to reserved for the second mobile station MS2 to send its next burst. At downlink time n+8, the base station indicates that the burst $D1_4$ was received by setting the R/N flag to received. In addition, the continued transfer from the second mobile station is interrupted by setting the BRI flag to reserved and the PE to the PEA of the first mobile station so as to allow the first mobile station to retransmit the not received burst $D1_2$ which was previously not received. At up-link time n+7, the third mobile station MS3 sends a burst as a result of a reserved access request during down-link time n+6. At down-link time n+9, the base station initiates the continued transfer from the second mobile station MS2 by setting the BRI flag to reserve, the PEQ flag to 1,0 to indicate that the PE is associated with the BRI flag and the PE is set to the PEA of the second mobile station. The base station also indicates the correct reception of the bursts transmitted by the third mobile station MS3 by setting the R/N flag to received. No PE match is required since this was a reserved and not a random access. At up-link time n+8, the second mobile station MS2 sends its second burst D2$_2$. At up-link time n+9, the first mobile station resends its second burst D1$_2$. Finally, at up-link time n+10, the second mobile station sends its third burst D2$_3$.

FIG. 14 illustrates an example of one mobile station communicating on a triple rate PDCH. In this example, the base station grants access to the channel by setting the channel status to BRI=reserved. At down-link time n, the mobile station MS1 detects an idle condition. At down-link time n+1, the base station sets the channel to idle. At up-link time n+1, the mobile station MS1 sends its first burst D1$_1$. At up-link time n+3 for slot 1, the base station having received the first burst correctly determines via a length indicator within the burst that the complete transfer unit comprises four bursts. In response, the base station sets the BRI flag to busy and the R/N flag to received. In addition, the PEQ flag is set to 1,1 indicating that the PE is associated with both BRI and R/N. In time slots 2 and 3, the base station sets the channel to BRI=reserved and the PEQ to 1,0 indicating that the PE is associated with the BRI flag. At up-link time n+4, the mobile station MS1 sends its remaining bursts D1$_2$, D1$_3$, and D1$_4$ on the slots having BRI set to reserved and PE equal to PEA. At down-link time n+6, in slots 1–3, the base station indicates the D1$_2$, D1$_3$, and D1$_4$ have been received by setting the R/N flag to R.

According to one embodiment of the present invention, a Reverse Packet Digital Control Channel (RPDCH) is divided into subchannels. Each subchannel adds delay between communications thus allowing sufficient processing time at both the mobile station and base station in conjunction with a random access event. As a result, the more subchannels the RPDCH is divided into the longer the delay. For Packet data it is very important for the transmissions to occur very fast. As a result, the PDCH has been defined to consist of three RPDCH subchannels, as opposed to six subchannels in a DCCH according to IS-136.

The PCF flags are carried in FDCCH time slots and serve to indicate the reception status of bursts sent previously on the RDCCH. The PCF flags are also used to indicate the availability status (i.e., Busy/Reserved/Idle) of their corresponding RDCCH bursts. A mobile station having an access pending reads PCF flags to determine when to begin its access attempt.

Figure 15:
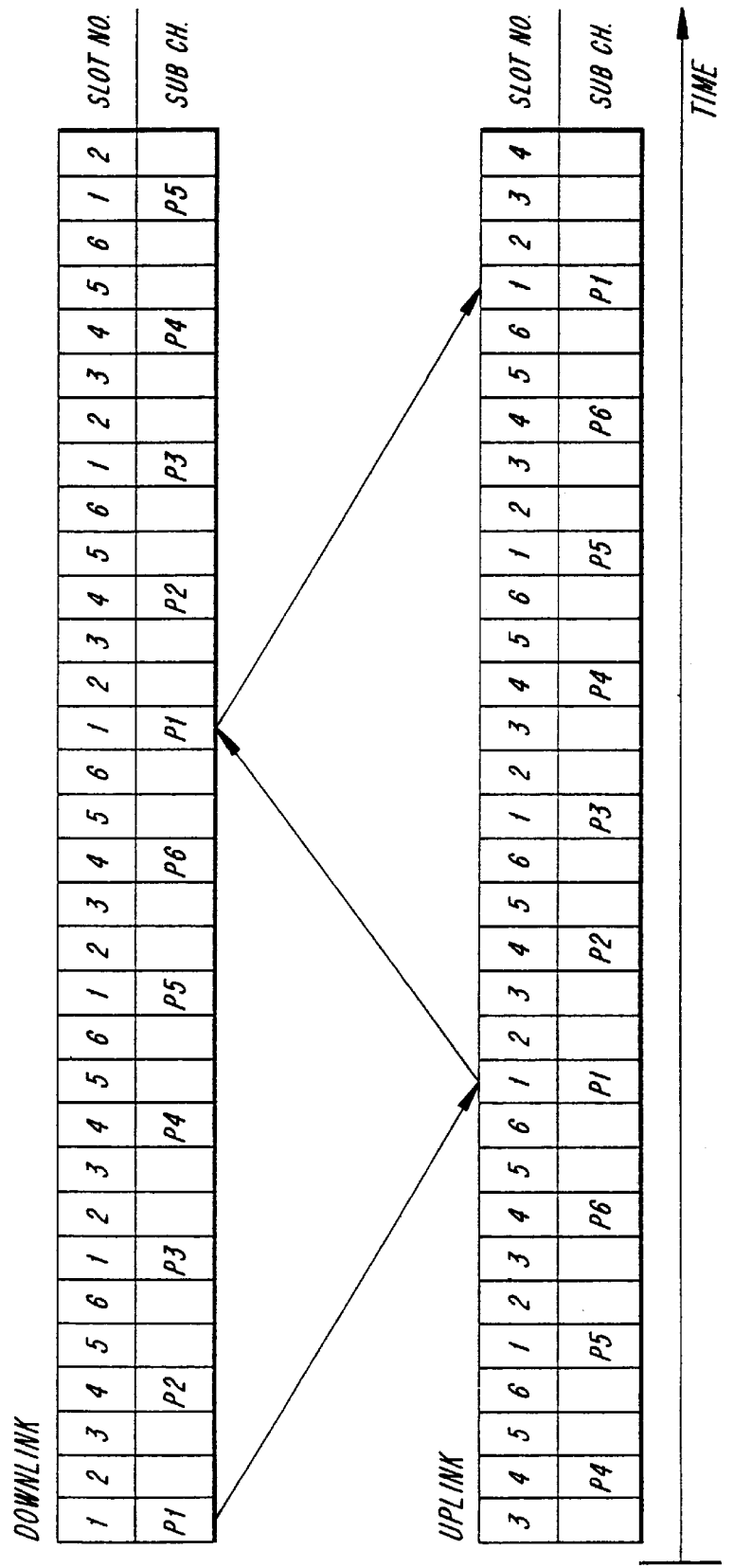
FIG. 15 illustrates the DCCH subchannels for full-rate DCCH according to IS-136.

If a full-rate PDCH exists then its RDCCH bursts and FDCCH slots are multiplexed so as to create 3 distinct access paths as shown in FIG. 10. Assuming that path 1 (P1) in the FDCCH indicates that the next P1 burst in the RDCCH is available (i.e., Idle) and is selected for an access attempt, a mobile station shall begin sending the first burst of its access at that time (24.8 ms) after receiving the full P1 slot in the FDCCH). The mobile station shall then being reading the PCF flags in the next P1 FDCCH slot (21.8 ms) after completing transmission of its access burst) to determine the BMI reception status of its initial access burst. In contrast to FIG. 10, FIG. 15 illustrates the subchannels used by a full-rate DCCH according to IS-136. As is apparent from comparing FIGS. 10 and 15, it takes twice as long in IS-136 to transmit the 3 bursts represented by the arrows. Similar advantages are also obtained for double- and triple-rate PDCH.

It should be noted that the PCF information carried in any given FDCCH slot is completely independent of the layer 3 information carried therein as the PCF flags occupy bandwidth completely separate from that assigned for PBCCH, PPCH, or PARCH purposes.

FIG. 11 shows the relationship between FDCCH PCF flags and RDCCH bursts. The arrows show the order of events associated with an access attempt. Thus, following the arrows from left to right on RPDCH subchannel P1, the BRI portion of the PCF flags first indicates the availability of the next P1 burst in the RDCCH. If a burst is transmitted in that RDCCH burst, then the mobile station reads the R/N portion of the SCF flags in the next P1 FDCCH slot to determine the BMI reception status of its transmitted burst. For the case of the first burst of a random access the mobile station also reads the PE portion of the PCF flags to determine whether or not its particular access was captured. The BMI sets the PE value to reflect the captured mobile station access. If the mobile station determines that its access was captured based on PE and that the R/N flag indicates received, it proceeds to send any additional bursts it has pending beginning in the next P1 burst in the RDCCH.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

We claim:

1. A method for transmitting packet data information over a packet data channel in a communication system, comprising the steps of:

providing a packet data channel over which a plurality of terminals can transmit said packet data information in an interleaved manner, said packet data information being addressed so that packets transmitted by different terminals can be routed to different destinations;

granting access of the packet data channel to a first communication device based on packet channel feedback information broadcast by said system, such that the first communication device transmits first packet data information on the packet data channel;

broadcasting, from said system, said packet channel feedback information associated with an interrupt status of said packet data channel;

interrupting the first packet data transmission from the first communication device for an interruption period in response to said broadcast interrupt status; and granting access of the packet data channel to a second communication device, wherein the second transmits second packet data information during the interruption period.

2. The method of claim 1, wherein the communication system is a mobile communication system, and the first and second communication devices are mobile terminals.

3. A method for temporarily interrupting transmission of data packets by a first communication device on a packet data channel in a communication system, comprising the steps of:

inserting control information into a control message generated by the system, said control information including packet channel feedback information associated with (1) granting access to said packet data channel and (2) interruption of transmission on said packet data channel;

transmitting the control message to the first communication device; and interrupting packet data transmission of the first communication device in response to receiving the control information for an interruption period as selectively indicated by said interruption information included in said packet channel feedback information.

4. The method of claim 3, wherein a second communication device transmits a second packet data message during the interruption period.

5. The method of claim 3, wherein the control information is a flag in a packet channel feedback field, and the control message is transmitted over a packet data channel.

6. The method of claim 5, wherein the flag is a partial echo qualifier flag.

7. The method of claim 5, wherein the packet data channel is a full-rate packet data channel subdivided into a plurality of subchannels, each subchannel causing a corresponding delay period to occur between transmissions of information.

8. The method of claim 7, wherein the full-rate packet data channel is subdivided into three subchannels.

9. The method of claim 3, wherein the control message is contained in a partial echo qualifier field within the packet channel feedback information.

10. The method of claim 3, wherein the packet data channel is a full-rate packet data channel subdivided into a plurality of subchannels, each subchannel causing a corresponding delay period to occur between transmissions of information.

11. The method of claim 10, wherein the full-rate packet data channel is subdivided into three subchannels.

12. The method of claim 3, wherein the communication system is a mobile communication system and the first and second communication devices are mobile terminals.

* * * * *